(12) United States Patent
Chiel et al.

(10) Patent No.: US 7,117,661 B2
(45) Date of Patent: Oct. 10, 2006

(54) MECHANICAL COLLECTION OF HARVESTED TREE-FRUIT

(75) Inventors: David Chiel, Afula Illit (IL); Eitan Zehavi, Kiryat Tivon (IL)

(73) Assignee: Dotan Ltd., Migdal Haemek (IL)

( * ) Notice: Subject to any disclaimer, the term of this patent is extended or adjusted under 35 U.S.C. 154(b) by 0 days.

(21) Appl. No.: 11/008,879

(22) Filed: Dec. 10, 2004

(65) Prior Publication Data

US 2005/0109006 A1     May 26, 2005

Related U.S. Application Data

(63) Continuation of application No. PCT/IL03/00542, filed on Jun. 26, 2003.

(60) Provisional application No. 60/391,572, filed on Jun. 26, 2002.

(51) Int. Cl.
*A01D 46/26* (2006.01)

(52) U.S. Cl. ........................................ 56/329; 56/340.1

(58) Field of Classification Search ............... 56/340.1, 56/329, 328.1
See application file for complete search history.

(56) References Cited

U.S. PATENT DOCUMENTS

| | | | |
|---|---|---|---|
| 3,541,773 A | * | 11/1970 | Pledger ........................ 56/329 |
| 3,683,617 A | | 8/1972 | Vallicella |
| 3,896,612 A | * | 7/1975 | McHugh et al. ............... 56/329 |
| 4,269,021 A | | 5/1981 | Friday |
| 4,414,795 A | * | 11/1983 | Johnstone et al. .......... 56/340.1 |
| 4,986,065 A | | 1/1991 | Compton |
| 5,469,695 A | | 11/1995 | Zehavi et al. |
| 5,816,037 A | | 10/1998 | Chiel et al. |
| 6,925,792 B1 | * | 8/2005 | Suter et al. ................. 56/340.1 |

* cited by examiner

*Primary Examiner*—Meredith C. Petravick
(74) *Attorney, Agent, or Firm*—Frishauf, Holtz, Goodman & Chick, P.C.

(57) ABSTRACT

A method and a system for collection of harvested tree-fruit having a collection device mounted on a hauled cart. For fruit collection, two arms are extended under the foliage of a tree to spread an apron hung between them, in a fruit receiving position. After harvesting is completed, and the apron contains the harvested fruit, the arms draw the apron away from under the tree, and swing through an arc of a circle to stop in a fruit discharge position, where fruit is discharged by gravity into the open top opening of the cart. Then, the arms are returned back from the discharge position to the fruit receiving position.

28 Claims, 11 Drawing Sheets

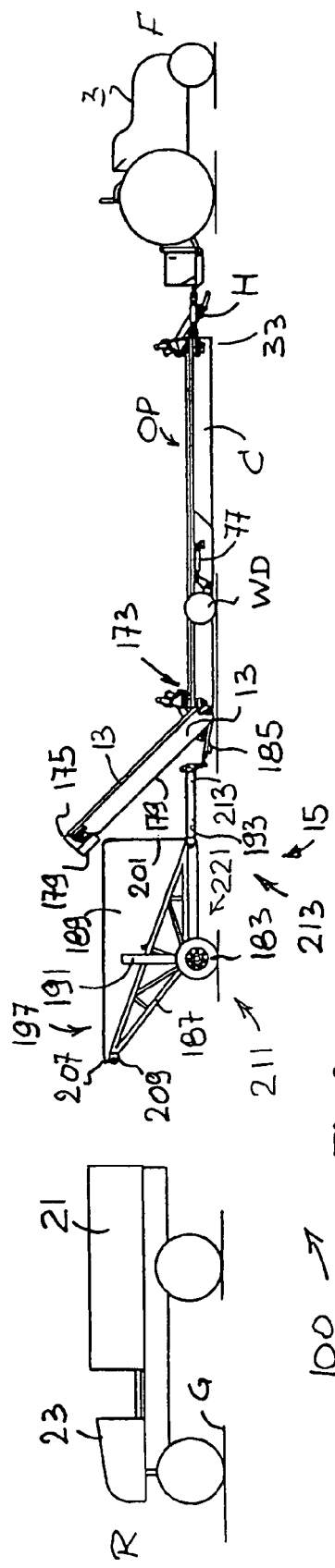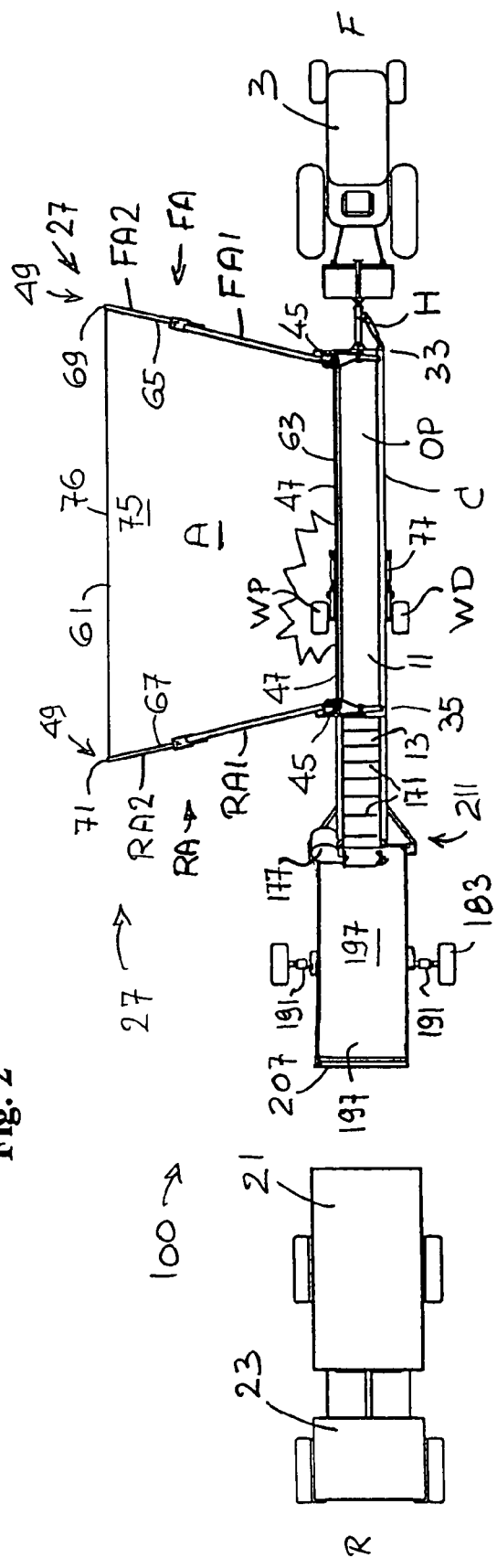

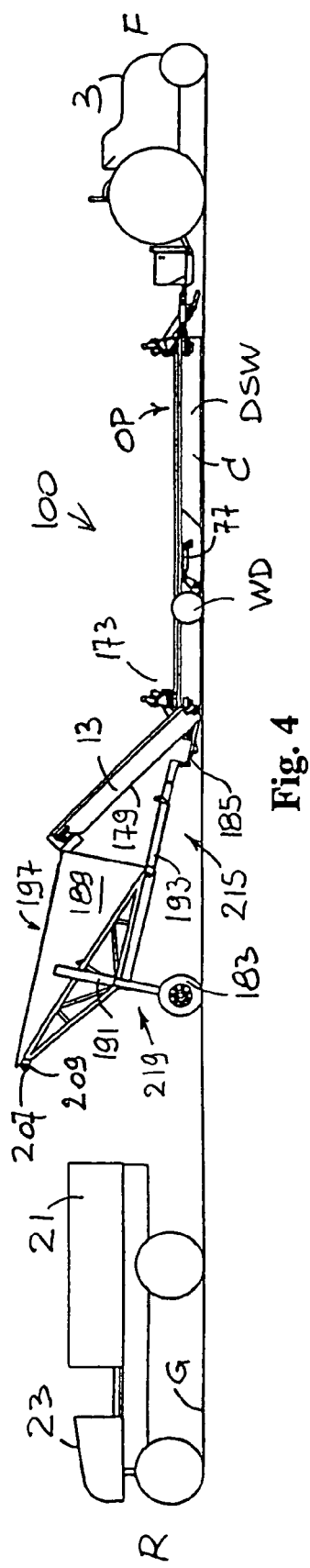
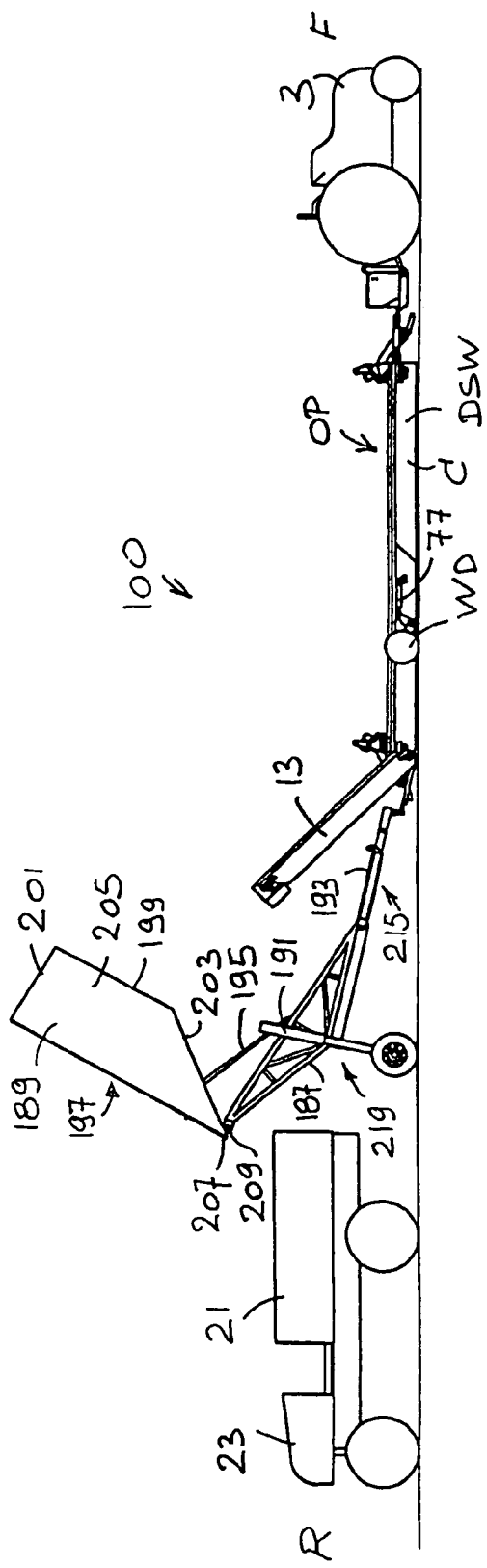
Fig. 4
Fig. 5

MECHANICAL COLLECTION OF HARVESTED TREE-FRUIT

This application claims the benefit of U.S. Provisional Application No. 60/391,572 filed on Jun. 26, 2002, and is a Continuation of PCT/IL03/00542 filed Jun. 26, 2003.

TECHNICAL FIELD

The present invention relates to the field of tree-fruit collection, and more particularly to the mechanical gathering and collection of fruit harvested from trees.

BACKGROUND ART

Economic pressure requires agricultural processes, alike industrial processes, to operate mechanically, thus with a minimum of manpower, and to yield superior results in the shortest possible time. Consequently, for the sake of efficient tree harvesting and fruit collection, fruit-tree grooves are planted in successive rows between which dedicated fruit harvesting and fruit collection equipment operates. Nowadays for example, mechanical harvesting is achieved by running a motorized harvester along a first row-side of a row of trees, stopping to clamp a vibrator on each successive tree-trunk, and using a deflector to guide the harvested fruit to the second row-side, for collection. In association with the deflector supported by the harvester on the first row-side, the fruit collection equipment being operated on the second row-side receives the fruit and forwards it for further transportation.

In U.S. Pat. Nos. 5,469,695 and 5,816,037, the present applicants disclose equipment for mechanical harvesting and for the collection of fruit from harvested trees, but those means are rather bulky, and expensive to acquire and maintain.

The terms "mechanical" and "mechanically" are used hereinbelow to define operations not requiring manual labor or manual intervention, besides the operation of controls by an operator or a driver.

Fruit collection equipment is required to feature simple construction, operate fast and reliably at minimal maintenance costs, and be offered to the market at low acquisition price. This contrasts with the hereinabove-mentioned fruit collection means, which are expensive to acquire and to maintain.

DISCLOSURE OF THE INVENTION

The fruit collection means referred to hereinabove are not only a heavy piece of expensive and complex machinery, but are provided with a fruit collection conveyor surface, which presents the problem of operating a conveyor lower-end elevated above the ground. This conveyor lower-end is maintained well above the terrain to prevent collision with obstacles on the ground, thus to prevent possible damage. However, by being relatively elevated above the ground, the conveyor lower-end is too high to penetrate under low hanging tree-branches, preventing the conveyor lower-end from approaching close to the trunk of the harvested tree. Thereby, fruit falling between the trunk and the conveyor lower-end is lost, including fruit guided down by a deflector toward the conveyor lower-end. Moreover, when the conveyor lower-end supports low hanging branches, these branches are practically not shaken, so that the fruit thereon is not harvested, thus lowering harvesting efficiency.

Therefore, since fruit-laden branches almost reach the ground, the presently disclosed fruit collection method and system have a unitary apron, hereinbelow the apron, which is positioned as low as the soil itself. The apron is spread to abut the tree-trunk of the harvested tree and to extend not only below the foliage of the harvested tree itself but also under the foliage of the previous and of the following tree in the same row of trees, proximate the trunk of those trees.

Therefore, since fruit-laden branches almost reach the ground, the presently disclosed fruit collection method and system have a unitary apron, hereinafter the apron, which is positioned as low as the soil itself. The apron is spread to abut the tree-trunk of the harvested tree and to extend not only below the foliage of the harvested tree itself but also under the foliage of the previous and of the following tree in the same row of trees, proximate the trunk of those trees.

The apron A, which is mostly quadrilateral, is first stretched out in a receiving position, to receive thereon the fruit from the harvested tree, and then, the apron is lifted from the ground, folds, and is emptied into the open top opening of a cart, when in a fruit discharge position. Receiving fruit and discharging fruit in one bulk is achieved in two strokes: one load stroke beginning by receiving the fruit and ending by discharging the fruit, followed by a return stroke, necessary to return to the receiving position. A simple two-stroke mechanism suffices to solve the problem of efficient and economic fruit collection, in one bulk.

The apron A, hanging between two arms, is stretched under the foliage of one tree out of a row of trees, which defines directions as the front F and the rear R opposite the front, and a first row-side opposite a second row-side. The apron resides on the second row-side, where one portion of the harvested fruit falls directly on the apron, while the portion of the fruit falling on the first row-side is guided toward the apron by a deflector appropriately supported by the harvester operating on the first row-side. When harvesting of the tree is completed, the two arms, operating in mutual simultaneously mirroring symmetry, draw away from under the foliage of the harvested tree, and swing to lift the apron from the ground and discharge the fruit contained therein into the open top opening of the cart. As explained hereinbelow, the two arms simply first draw, and then swing through an arc of a circle in a load swing, and return via a reverse swing and a reverse draw, to their original position. The kinematics of the strokes is detailed hereinbelow.

The disclosed solution presents a fruit collection method allowing the implementation of a simple and reliable collection system. Only a pair of suitably pivoted arms and an apron are needed to receive and discharge the fruit into an appropriately configured opening in a cart.

BRIEF DESCRIPTION OF DRAWINGS

For a better understanding of the present invention and to show how the same may be carried out in practice, reference will now be made to the accompanying drawings, in which:

FIG. 2 is a side view of the collection system shown in FIG. 1;

FIG. 3 is a top view of the collection system seen in FIG. 1;

FIGS. 4 and 5 are side views of the collection system of FIG. 1, in different stages of discharge;

MODES FOR CARRYING OUT THE INVENTION

Figure 1:
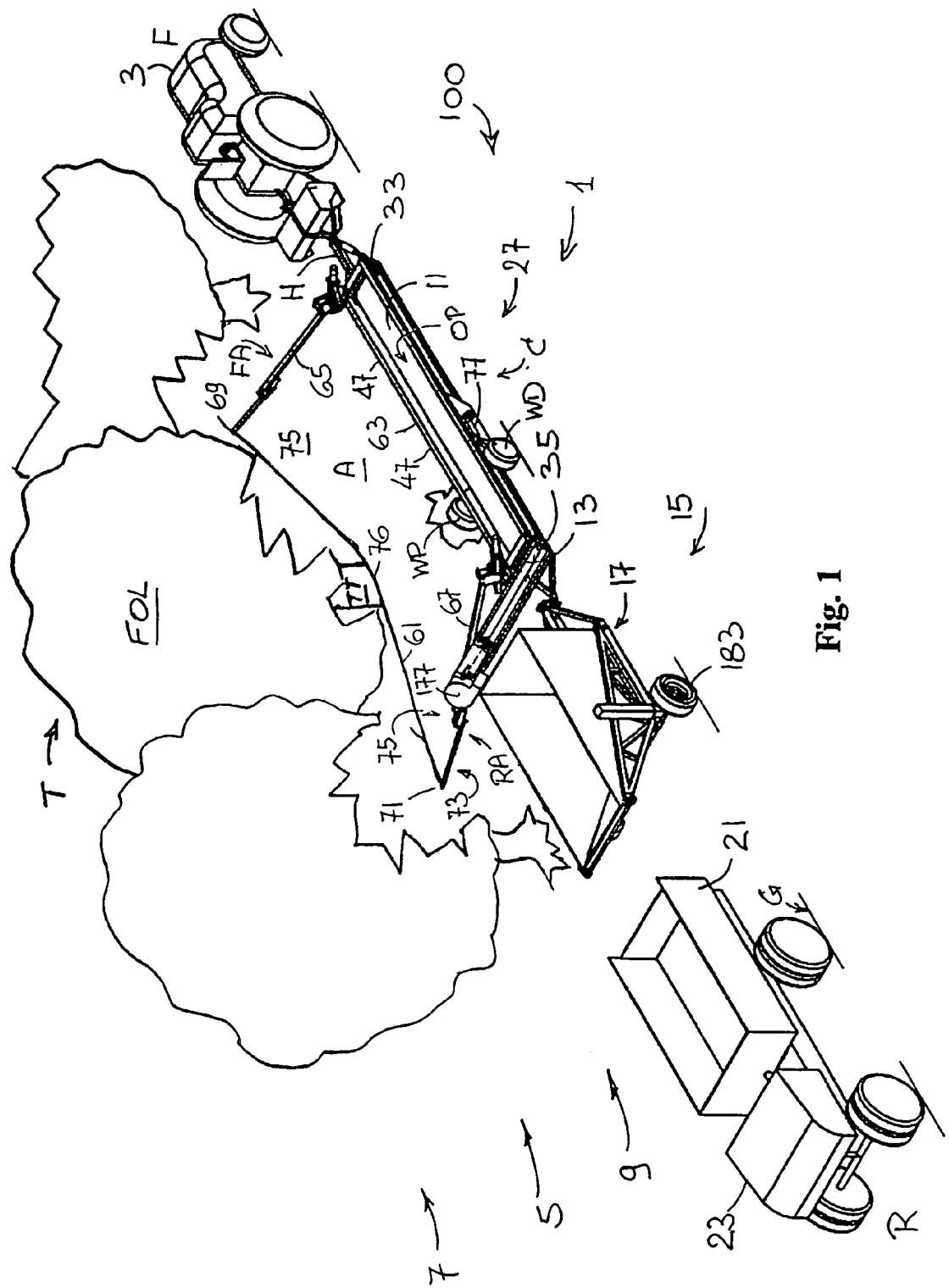
FIG. 1 is a perspective view of a fruit collection system according to a first embodiment 100.

A collection system 1 for the mechanical gathering and collection of fruit from a harvested tree T, is shown as a first embodiment 100 in FIGS. 1 to 5, as a second embodiment 200 in FIGS. 6 to 10, and as a third embodiment 300 in FIGS. 11 to 14. The collection system 1 has as at least two vehicles headed at the front F by an agricultural vehicle, driven in parallel to a row of trees 5 to be harvested. The row of trees 5 defines a front F, a rear R, a first row-side 7 where the harvester operates, and opposite thereto, a second row-side 9, where the collection system 1 operates.

The tractor 3 hauls at least one open top elongated cart C, or C200, or C300, having a longitudinal axis, but different for each one of the embodiment, respectively 100, 200, and 300. It is assumed that the tractor 3 powers the collection system 1 by hydraulic or other means.

The tree-fruit harvested from a tree T is referred to hereinbelow as the fruit. The fruit is gathered from a harvested tree T into a unitary apron A, hereinbelow the apron A, which is supported between two arms, namely a front arm FA and a rear arm RA, or for short, the arms FA and RA. The fruit is discharged from the apron A into an open top opening OP of the cart C, or C200, or C300, by simultaneous displacement of both arms FA and RA, in mutual mirroring symmetry. Next, only for the embodiments 100 and 200, the fruit is transferred from, respectively, the cart C and C200, by means of a bottom conveyor 11, and a lifting conveyor 13, into a fruit collector 15. In the first embodiment 100, the fruit collector 15 is a trailer 17 hauled by the cart C. In the second embodiment 200, the fruit collector 15 is a container 19 carried by the cart C200 itself. Both the trailer 17 and the container 19 are later discharged into an open top load box 21 of a transport vehicle, such as a truck 23, for further disposal.

In a third embodiment 300, shown in FIGS. 11 to 14, configured to suit fruit such as almonds, the collection system 1 is constituted but by the tractor 3 and a cart C300 accommodated to spread the collected fruit on the ground G, as a trail of fruit left to dry before being picked-up. The cart C300, which is similar to the cart C, is stripped from the bottom conveyor 11 opposite to the open top opening OP, to leave free passage to the ground G via an open bottom passage 25, and therefore, is also stripped from the lifting conveyor 13, which is now purposeless.

Reference is now made to FIG. 1, wherein portions of the foliage of the trees and a portion of the apron A are cut out to present a better view. The collection system 1 is driven along the second row-side 9 of the row of trees 5, hauling a cart C, or C200, or C300, supporting a collection device 26, in parallel to a motorized harvester, not shown in the Figs., but running on the first row-side 7. Once the apron A is spread on the second-row-side 9 in receiving position 27, thus to receive the harvested fruit thereon, the harvester operative on the first row-side 7 shakes the tree T. On the second row-side 9, the fruit lands directly on the spread apron A. A deflector, appropriately supported by the motorized harvester but not shown in Figs., guides the fallen fruit dropping on the first row-side 7, toward the second row-side 9 and into the apron A.

The collection device 26, with the apron A, the arms FA and RA, and the associated mechanisms, are described hereinbelow in detail.

The hereinabove-mentioned harvester and deflector are, for example, of the type disclosed by the present applicants in the International Patent Publications Nos. WO 02/069693 A2 and WO 02/089556 A2, which are incorporated herewith in whole by reference.

The above-mentioned harvester and deflector are, for example, of the type disclosed by the present applicants in the International Patent Publications Nos. WO 02/069693 A2 and WO 02/089556 A2, which are incorporated herewith in whole by reference.

For the sake of orientation, front F indicates the direction of advance of both the harvester and of the collection system 1, while rear R or back designates the opposite direction. The collection system 1 is driven on the second row-side 9, where proximal refers to the direction closer to the row of trees 5, while distal relates to the direction away from the row of trees.

In the description hereinbelow similar reference numerals and reference characters refer to similar elements in the various Figs.

With reference to FIGS. 1 to 14, the cart C, or C200, or C300, is generally a low-riding, slender channel 31 of shallow height with an open top opening OP, and with a front portion 33 and a rear portion 35 opposite the front portion. The cart C, or C200, or C300, is hitched by a height-adjustable power-lift hitch H pertaining to the tractor 3, hereinbelow hitch H. The cart C, or C200, or 0300, has four peripheral upstanding planar walls, namely, a proximal sidewall PSW, a distal sidewall DSW, a front wall FW, and a rear wall RW, which define the open top opening OP and the open bottom passage 25.

Only the carts C and C200 have a bottom 37 attached to the four peripheral upstanding planar walls, which bottom is removable. For the carts C and C200 the bottom 37 is accommodated as a bottom conveyor 11, and the rear wall RW is configured as a lifting conveyor 13 that slants upwardly as well as away toward the rear R. The cart C300 has no bottom, but a bottom passage 25 opposite the open top opening OP.

The proximal sidewall PSW, distal sidewall DSW, front wall FW, and rear wall RW define the open top opening OP.

A retaining wall 41 mounted atop the distal sidewall DSW, and a ramp 43 coupled to the proximal sidewall PSW, which are present in all the embodiments 100 to 300, are not shown in FIGS. 1 to 10, for the sake of clarity, but will be described hereinbelow with respect to the third embodiment 300, and with reference to the FIGS. 11 to 14.

Two arms FA and RA, operative in the embodiments 100, 200, and 300, are both mounted appropriately in mutual spaced apart distance from each other, and each one of the two arms FA and RA is connected by a retained end 45, which is pivotally coupled to the cart C, C200, or C300. The retained ends 45 are pivotally coupled in appropriate spaced apart distance opposite and mutually away from each other, with each retained end being coupled to, respectively, a front portion and a rear portion of the cart C, C200, or C300. Each retained end is coupled to the proximate sidewall PSW or to the rim 47 thereof, or to a structure adjacent to the proximate sidewall PSW, but always at the front and at the rear of the cart on or adjacent the proximate sidewall PSW, as seen in FIGS. 1 and 3. The arms FA and RA both slant down from the retaining end 45 toward the ground G, and each one of the arms FA and RA rests on the ground G, on a free extremity 49 thereof.

Figure 6:
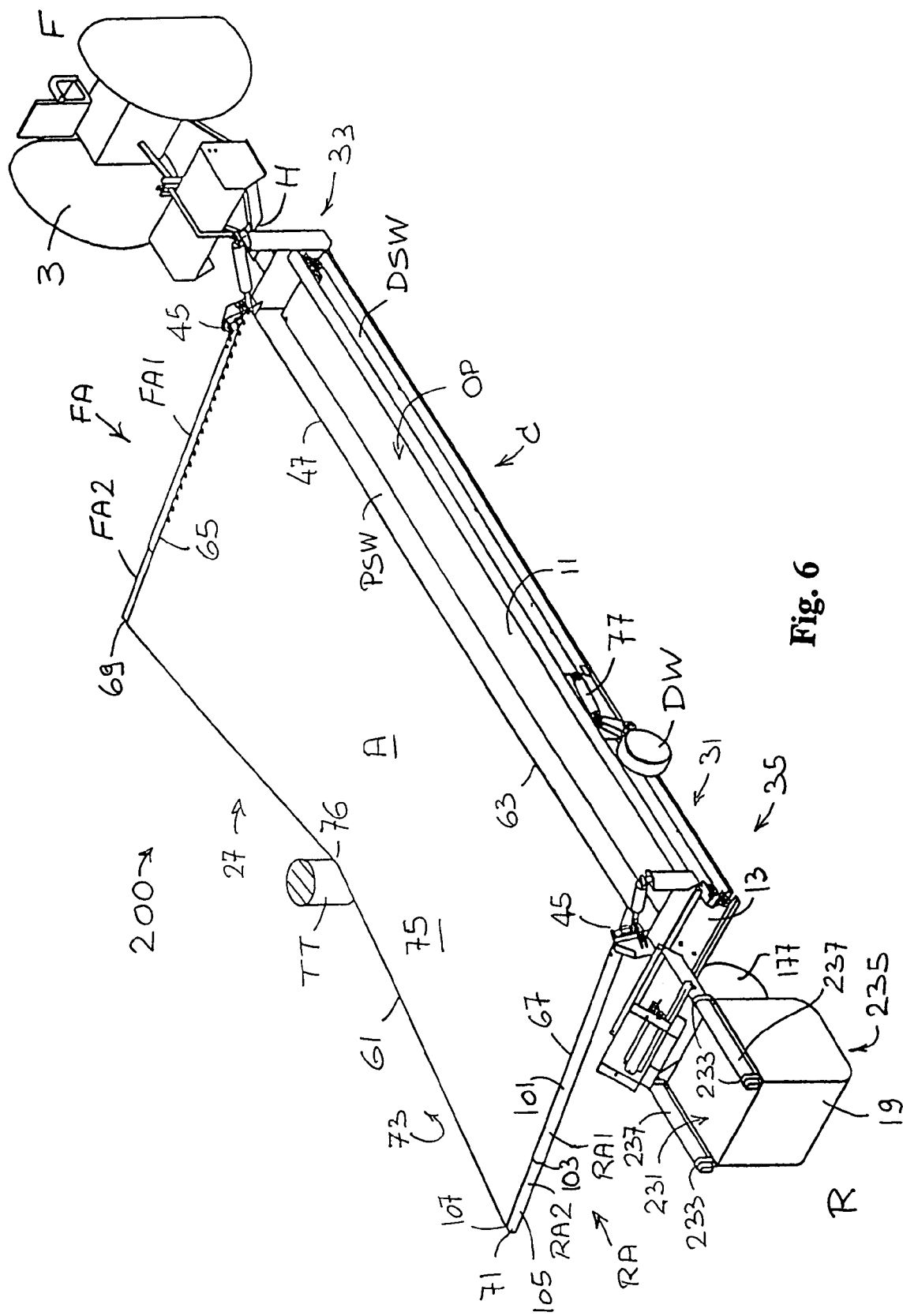
FIGS. 6 and 7 are respectively, a perspective view and a rear view of a second embodiment 200.

In the receiving position 27 and according to needs, the arms FA and RA are either mutually extended in spread-apart extension, as seen in FIG. 1, or extended in parallel, as shown in FIG. 6. In spread-apart extension, the free extremity 49 of the arms FA and RA are distanced farther away from each other than their retained end 45, thus requiring a rather trapezoidal apron A. In contrast, when the arms FA and RA are parallel, the apron A is substantially rectangular. The front arms FA and RA are thus extended proximally away from the cart C, C200, or C300, to support the apron A hung between them and affixed over the rim 45 of the proximal sidewall PSW of the cart. The apron A is partially spread on the ground G, when in the receiving position 27, which is the position for gathering harvested fruit.

The front arm FA is formed as two portions, namely a front arm primary portion FAl and a front arm secondary portion FA2. Likewise, the rear arm FA has a rear arm primary portion RA1 and a rear arm secondary portion RA2. The front arm primary portion FA1 and the rear arm primary portion RA1 are referred to hereinbelow as the primary arms FA1 and RA1, while the front arm secondary portion FA2 and the rear arm secondary portion RA2 are related to hereinbelow as the secondary arm portions FA2 and RA2.

Figure 7:
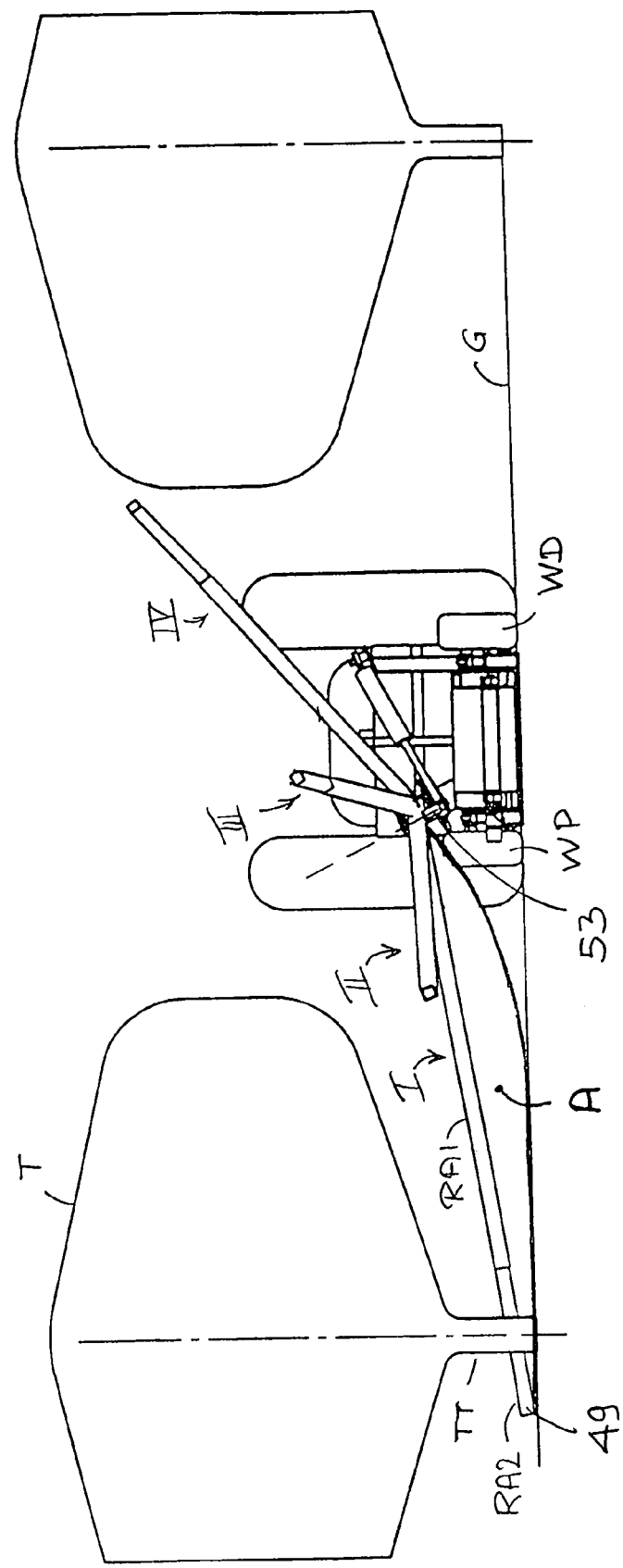
Figure 14:
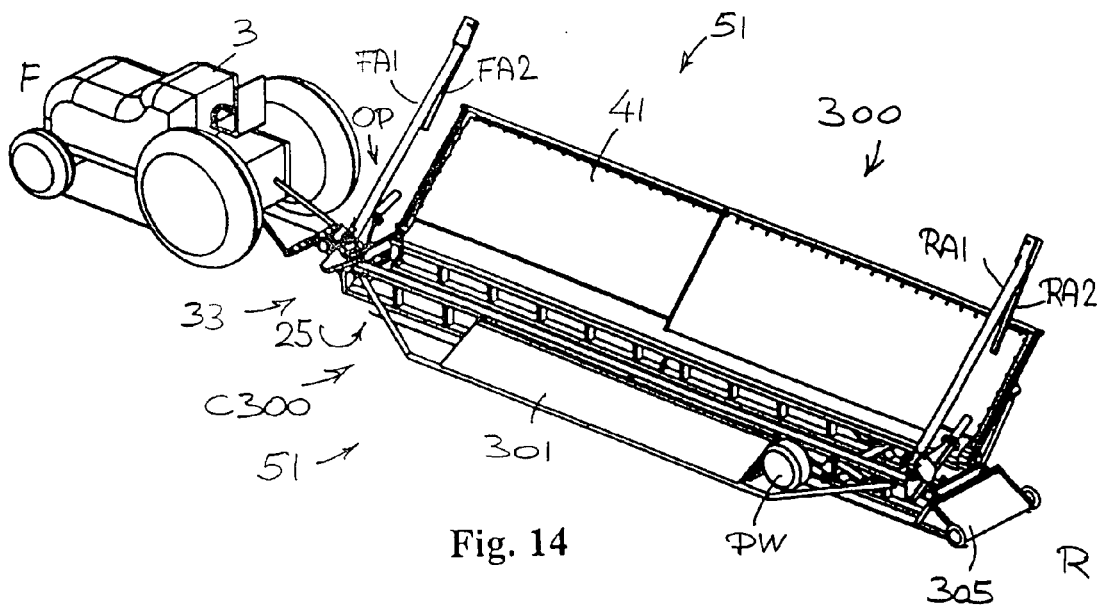

After fruit has been gathered on the spread apron A, both arms FA and RA are simultaneously and in mutual mirroring symmetry first drawn, and second, swung to a discharge position 51, shown in FIGS. 7 and 14, to sway the apron A and to discharge the fruit by gravity into the open top opening OP.

Reference is now made to FIG. 7 for the description of an example of the draw and swing motions, or draw and swing for short, effectuated by one configuration of the front arms FA and RA. Only the tractor 3 and the cart C, C200, or C300, and the front arm FA, are seen in a view from the rear toward the tractor, with the rear arm FA being removed for the sake of clarity. The tractor 3, shown in FIG. 7 without the driver's seat, is driven on the second row-side of a proximal row of trees 5, whereas another row of trees 5D is distal thereto. In other words, the tractor 3 runs between a proximal and a distal row of trees, 5 and 5D. The example illustrated by FIG. 7 refers only to the motion of the front arm FA, taking into consideration that the rear arm FA operates simultaneously in mutual mirroring symmetry, and therefore, needs not to be described separately.

Four different successive positions of the front arm FA are described, namely the first position I, the second position II, the third position III, and the fourth position IV, all four positions being depicted in superposition in FIG. 7.

In the first position I, the front arm FA is extended in perpendicular to the cart C, C200, or C300, thus spread in parallel, as shown in FIG. 6. In the first position I in FIG. 7, the front arm FA resides in the plane of the paper and is shown in true length, to the scale of FIG. 6. The front arm FA is inclined toward the ground G, and the secondary front arm portion FA2 is shown drawn-out from the primary arm portion FA1. The free extremity 49 of the front arm FA, here the free extremity of the secondary arm portion FA2, rests on the ground G on the first row-side 7, and the apron A, which is supported by the arms FA and RA and hangs between them, is spread and rests partially on the ground, while being fixedly retained over the rim 47 of the proximal sidewall PSW. The first position I is thus the receiving position 27, where the fruit from one tree T is received in one bulk on the apron A.

In FIG. 7, the apron A is shown only for the first position I, for the sake of clarity.

To reach the second position II, the secondary front arm portion FA2 has first been drawn, here drawn-in, at least partially, for example by translation, for retraction into the primary front arm portion FA1, which has then been swung out of the plane of the paper by pivoting about a pivot 53 positioned in spatial orientation respective to the ground G, which pivot is the pivotally retained end 47. At the end of the draw, the front arm FA reaches the load position 55, from where the load swing begins. In the second position II, the front arm FA is thus seen at the beginning of the load swing, in the early stages of its climbing swing trajectory. The front arm FA has lifted-off from the ground G, and although not shown, the apron A folds partially and confines the fruit therein. The arm FA has thus lifted and the apron A is folded.

In the third position III, the front arm FA has been swung further and is slightly past alignment with the longitudinal axis of the cart C, C200, or C300, thus residing just past a plane normal to the plane of the paper. The length of both primary arms FA1 and RA1 is evidently determined to prevent mutual collision during swing, or swing motion. Once past alignment with the cart C, C200, or C300, the secondary front arm portion FA2 is drawn, here drawnout, or extracted by translation, to further stretch the apron A, for discharge of the fruit by gravity into the open top opening OP. As described hereinbelow, it is not always necessary to draw in the discharge position 51.

The discharge position 51, or fourth position IV, is attained when the front arm FA has swung through an arc of about half a circle relative to the receiving position 27, or first position I. Even though the apron A is not depicted, it is evident that it is now stretched to discharge the fruit by gravity, in one bulk, into the open top opening OP. However, as described hereinbelow, it is often sufficient to stretch that portion of the apron A residing between the primary arm portions FA1 and RA1 to discharge fruit. Further, instead of being drawn by translation in retraction and extraction, the secondary front arm portion FA2 may be pivoted to fold relative to the primary front arm portion FA1 as illustrated in the FIGS. 11 to 14, and achieve the same effect and results.

It is noted that the face of the apron A that faced away from the ground G thus the face in which the fruit was collected in the receiving position 27, or first position I, may face toward the ground in the discharge position 51.

The load stroke, starting from the receiving position 27 and ending in a discharge position 51, is covered in reverse direction motion during a return stroke, which returns both the front arm FA and the rear arm RA from the discharge position to the receiving position.

The arms FA and RA function in two strokes, namely a load stroke and a return stroke. During travel of the collection system 1, the arms FA and RA may be held in position at any appropriate point on the return trajectory of the return stroke, to facilitate passage between the foliage FOL of the trees.

Each one of the two strokes executes two different phases of motion, namely a draw motion and a swing motion, referred to as draw and swing, performed simultaneously in mutual mirroring symmetry by both arms FA and RA. The draw relates to the motion of the secondary arm portions FA2 and RA2, while the primary arm portions FA1 and RA1 perform the swing. When in receiving position 27, at least a partial draw is necessary to prevent collision with the branches or the foliage FOL of the tree T during swing trajectory of the of the load stroke. In the load stroke, a load draw brings the arms FA and RA from the receiving position 27 to a load position 55, from where the arms FA and RA swing, in load swing, to the discharge position 51. The return stroke carries the arms FA and RA in return swing from the discharge position 51 back to the load position 27, for return draw to the receiving position 27. Evidently, if the secondary arm portions FA2 and RA2 were fully, or at least partially drawn-out to stretch the apron A in the discharge position 51, they may be drawn-in if desired, before starting the return stroke.

The unitary apron A is made of a pliable material, either natural or synthetic, such as canvas, duck, plastic sheet, or the like, either plain or meshed as a net. The apron is usually quadrilateral, either rectangular as seen in FIG. 6, or trapezoidal as illustrated in FIG. 1, with a proximal edge 61 opposite a distal edge 63, a front edge 65 supported by the front arm FA opposite a rear edge 67 supported by the rear arm RA, a front corner 69, and a rear corner 71. If desired, the apron A is implemented as more than one layer of material, or as an apron made by attaching together two or more pieces of material.

The apron A further defines a ground face 73 that faces the ground G when in the receiving position 27, and a receiving face 75, opposite the ground face 73, for receiving thereon the fruit harvested from one tree T, together in one bulk.

Figure 11:
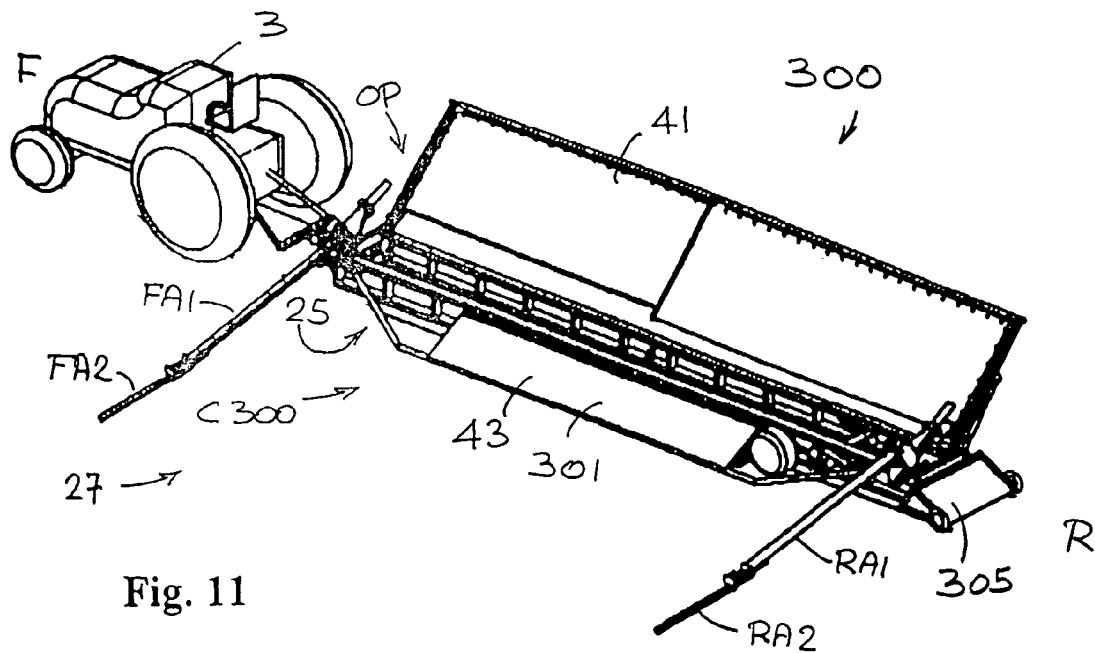
FIGS. 11 to 14 are perspective views of a third embodiment 300.

When in the receiving position 27, as shown in FIGS. 1, 6, and 11, the apron A is fully spread out proximally, thus laterally away from the cart C, C200, or C300, with the front edge 65 and the rear edge 67 being supported between, respectively, the front arm FA and the rear arm RA. The free extremity 49 of each arm FA and RA rests on the ground G, and so does a portion of the apron A.

The secondary arm portions FA2 and RA2 are the portions that have to be drawn back, at least partially, to reach the load position 55, from where the load swing starts. In the return stroke, after the return swing, the secondary arm portions FA2 and RA2 must be drawn out completely, in return draw, for return to the receiving position 27.

It is realized that since the ground in the field is far from being a perfect flat surface, the cart C, C200, or C300, may tilt, which tilt may hinder the proper swing and draw of the arms FA and RA into the receiving position 27. A cart attitude control mechanism is thus required to enable proper operation of the arms FA and RA in the load and return strokes.

The cart C, C200, or C300, rides on two side wheels, which are designated, respectively, as the proximal wheel WP and the distal wheel WD, also referred to hereinbelow as the wheels WP and WD. Each one of the wheels WP and WD is connected to the cart C, C200, or C300, close to the rear R thereof, through an independently height-adjustable cart-lift mechanism 77, which is located either to the front or to the rear of the two wheels WP and WD, for regulating the height of the of the cart C, C200, or C300, relative to the ground G. Lifting mechanisms 77, such as hydraulic cylinder-and-piston units, are known in the art, and therefore, the cart-lift mechanism 77 is not described.

By separate operation of the cart-lift mechanism 77, which works independently on each one of the two wheels WP and WD, and also by independent operation of the hitch H, the height and the inclination of the cart C, C200, or C300, above the ground G is adjusted as desired by the operator driving the tractor 3. The hitch H and the cart-lift mechanism 77, enable control of the height of the cart C, C200, or C300, and its spatial attitude relative to the ground G, thus control of the orientation.

In the following three attitude control examples, the displacement of the cart C, C200, or C300, assumes a flat planar ground G for the sake of description only.

First, when the hitch H and the cart-lift mechanism 77 exert a vertical displacement of the same length, up or down, the cart C, C200, or C300, translates, respectively, vertically down toward the ground G, or vertically up and away therefrom.

Second, the cart C, C200, or C300, is pitched around the pivot created by the two wheels WP and WD when the hitch H is lifted or lowered without operating the cart-lift mechanisms 77. Likewise, rising or lowering the cart C, C200, or C300, by simultaneous equal stroke operation of both cart-lift mechanisms 77 relative to the immobile hitch H becoming a pivot, also pitches the cart. Evidently, pitch is also achieved by combined translation of the hitch H and of the two wheels WP and WD.

Third, for example, when either one of both cart-lift mechanisms 77 operates on one of the two wheels WP and WD, or operates differentially thereon, then, the cart C, C200, or C300, is displaced in roll, i.e., the cart rotates around its longitudinal axis. It is thus clear that the spatial attitude of the cart C, C200, or C300, may be controlled according to any one of the three hereinabove-described examples by use of the hitch H and of the cart-lift mechanisms 77, operating either alone or in combination.

The attitude of the cart C, C200, or C300, when lowered to the ground G, is referred to as the harvesting configuration 79, whereas when lifted above ground for travel, that attitude is designated as the traveling configuration 81.

In the receiving position 27 shown in FIG. 1, a portion of the apron A is spread on the ground G under the foliage FOL of the tree T to be harvested, and in abutment with the tree trunk TT. In this receiving position 27, both arms FA and RA are proximally extended, thus laterally away from the cart C, C200, or C300, and toward the tree T. Although as shown FIG. 1, the arms FA and RA are mutually extended away in spread-apart extension out of parallel, with the front arm FA slanted toward the front F and the rear arm RA slanted toward the rear R, the arms FA and RA may, if desired, be proximally extended in parallel to each other, as shown in FIG. 6.

In the receiving position 27, the secondary arm portions FA2 and RA2 are fully drawn, thus drawn-out, respectively and in correspondence, with the primary arm portions FA1 and RA1, and rest on the ground G on the first row-side 7, or if desired, may reach not further than the second row-side 9, under the foliage of the tree T. The term draw is used hereinbelow with reference to both drawing in and drawing out motions.

The front corner 69 and a rear corner 71 of the apron A, are fixedly attached to the free extremity 49 of, respectively, the secondary front arm portion FA2 and the secondary rear arm portion RA2. Therefore, as best seen in FIG. 1, to rest the free extremity 49 of each secondary arm portion FA2 and FR2 on the first row-side 7, the proximal edge 61 of the apron A is pressed in abutment against the tree trunk TT of the harvested tree T, and stretched. The originally straight proximal edge 61 of the apron A is thus deformed into a V-shape, with one leg of the V on each side of the trunk TT. A major portion of the apron A thus rests below the foliage FOL of the tree T, while a minor portion thereof rests under the foliage of the preceding tree and of the following tree out of the row of trees 5. In fact, a middle edge portion 76 of the proximal edge 61 of the apron A rests on the ground G, on the second row-side 9, in pressed abutment against the trunk TT of the harvested tree T. Meanwhile, the front corner 69 of the apron A rests on the ground G on the first row-side 7, adjacent a tree-trunk following the tree to be harvested, and the rear corner 69 is on the ground adjacent a tree-trunk preceding the tree to be harvested.

The largest portion of the apron A thus resides on the second row-side 9 when in the receiving position 27, but another portion thereof resides on the first row-side 7, where it reaches to rest below the deflector, which is supported by the harvester. Therefore, the secondary arm portions FA2 and RA2 must first be-drawn in, at least partially, for all of the apron A to reside solely on the second row-side 9 and to reach the load position 55, before the load swing starts to swing the primary front arm portions FA1 and RA1. It is explained hereinbelow that drawing of the secondary arm portions FA2 and RA2 refers, for example, to translation in extraction and in retraction, or to pivoting in unfolding and in folding, according to the mechanism selected for the implementation of the draw motion.

It is necessary to draw both secondary arm portions FA2 and RA2, at least partially, before staring the load swing, to prevent collision of the arms FA and RA with the foliage FOL of the tree T. Drawing is implemented by a mechanism providing simultaneously linear translation or pivotal folding of the secondary arm portions FA2 and RA2 relative to respectively, the primary arm portions FA1 or RA1. A linear translation mechanism is possibly implemented as a piston translating relative to a hydraulic cylinder, while pivotal folding is achieved, for example, by a pivot or a hinge about which folding occurs.

Figure 15:
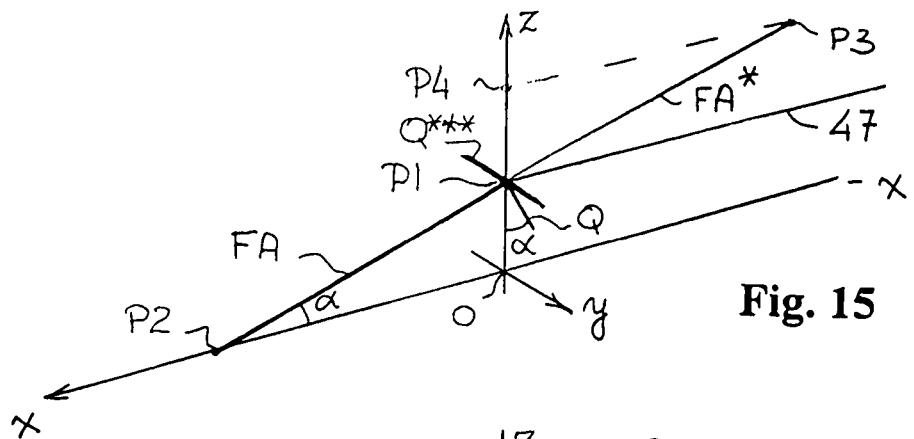
FIGS. 15 to 17 present the kinematics of the arms used for collecting the fruit.
Figure 16:
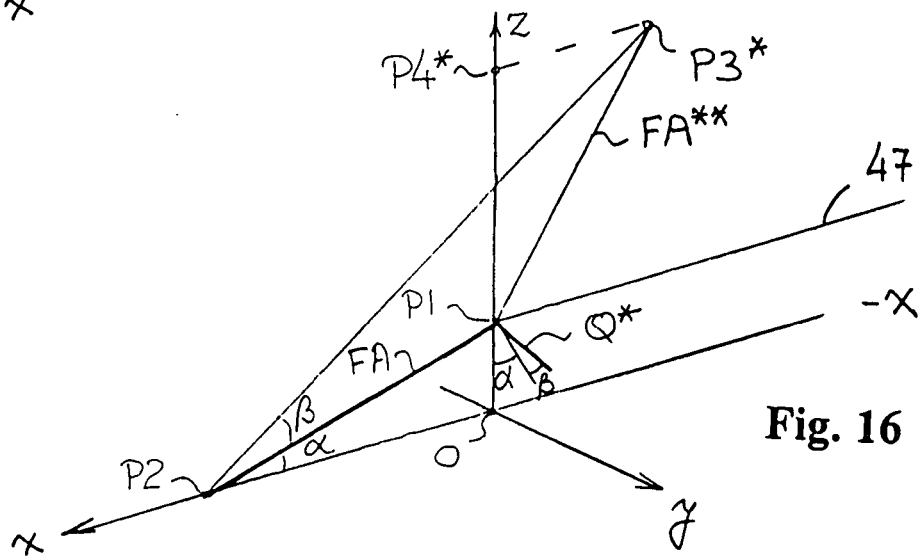
Figure 17:
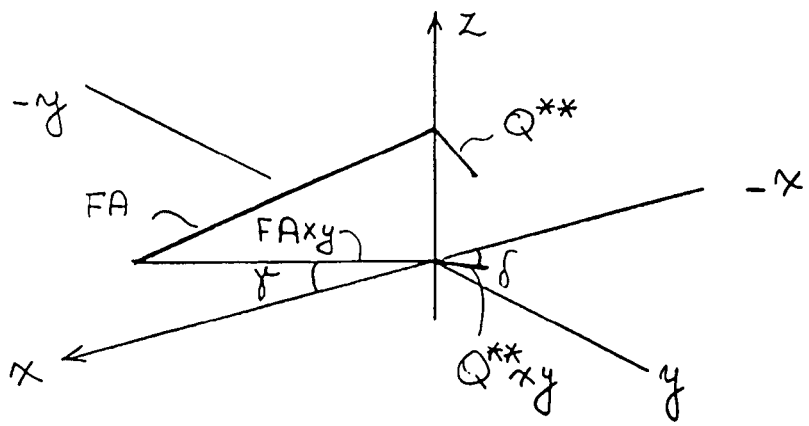

Reference is now made to FIGS. 15 to 17 for the description of the concepts of kinematics involved with the swing of the arms FA and FA. For the sake of clarity of the FIGS. 15 to 17, mechanical elements are represented symbolically as lines. Thus, for example, an elongated arm orthogonal to its short pivot, or axis of rotation, is represented as, respectively, a long leg in perpendicular to the short leg of the letter L. For the sake of simplicity, the description hereinbelow refers to the front arm FA, but is alike for the rear arm RA, as both arms move simultaneously in mutual mirroring symmetry.

The kinematics presented hereinbelow refer to the load swing of the primary front arm portion FA1, assuming that the secondary front arm portion FA2 has already been drawn. The return swing of the primary front arm portion FA1 follows the same trajectory as the load swing, but in reversed direction of motion.

With reference to FIG. 15, in a right-angle embodiment 1000, a front arm FA is coupled in perpendicular to a pivot 121, and both reside in the x-z plane of a system of orthogonal coordinates having eight quadrants and an origin O. It is pointed out that in the right-angle embodiment, should the arm FA be spun around the pivot 121, that arm FA would become the generatrix of a planar circular surface.

In the x-z plane, the front arm FA makes an angle $\alpha$ with the plane x-y representing the ground G. Typically the angle $\alpha$ is 10°, but may span the range between 5° and 15°. It is noted that the front arm FA resides in the first quadrant, where the x-axis is positive, while the pivot 53 lies in the second quadrant, where the x-axis is negative. A first point P1 located on the positive z-axis above the origin O represents the retained end 45 of the front arm FA, which is pivotally coupled to the cart C, or C200, or C300. A second point P2 represents the resting point of the free extremity 49 of the front arm FA on the ground G. This schematic illustration defines the orientation of the front arm FA when in the load position 55.

It is assumed for the purpose of illustration only, that the proximal sidewall PSW is vertical and resides in the y-z plane, and that the line L originating at the point P1 and parallel to the positive y-axis represents its rim 47. In other words, the front arm FA is extended from the rim 47 of the proximal sidewall PSW, sloping at the angle $\alpha$ toward the ground G in perpendicular and proximally away from the cart C, or C200, or C300.

In load swing the front arm FA is swung out of the x-z plane about the pivot Q, passing first through the first quadrant and next, into the second quadrant, to end in the negative-x-positive-z plane, where the new swung position of the front arm FA is designated as FA*. The front arm FA* has thus covered an arc spanning half a circle, to reach the discharge position 51, where the front arm FA* is extended in perpendicular and distally away from the proximal sidewall PSW residing in the y-z plane. Actually, in the present example, the front arm FA* extends also in perpendicular above and distally away from the distal sidewall DSW, not shown in FIG. 15. The front arm FA* thus rises above the open top opening OP in discharge position 51. It is noted that the free extremity 49 of the front arm FA, designated as point P3 in the negative-x-positive-z plane, has risen to twice the height above-ground G when compared to the height of the pivotally retained end 45. The height above-ground of the point P3, shown projected on the axis z as point P4, is equal to twice the length of the front arm FA multiplied by the sine of the angle $\alpha$, or for short, length FA time sine $\alpha$.

One may now consider a pair of right-angle embodiment arms FA and RA in the load position 55, with the apron A supported between them, with a distal edge 63 of the apron A attached over the rim 47 of the proximal sidewall PSW. In other words, the two arms FA and RA are perpendicular to their pivot Q. When the front arm FA and the rear arm RA are swung simultaneously in mutual mirroring symmetric motion, thus counter-rotating, from the load position 55 to the discharge position 51, the apron A is first lifted from the ground G, folding and bulging under the load of the fruit confined therein. Further swinging, the free extremities 49 of the arms FA and RA come to their mutual closest, and past this stage, begin to unfold and then stretch the apron A. Finally, when in discharge position 51, the apron A is taut and the fruit are discharged by gravity into the open top opening OP.

Despite the considerable advantage provided by the simple concept described above, the geometry of the mechanism is not always practical. Sometimes it is desired to draw the secondary arm portions FA2 and RA2 from the primary arm portions FA1 and RA1 and to swing the arms FA and RA for a full arc of half a circle into the discharge position 51. However, the distance between consecutive rows of trees 5 is sometimes so close that the secondary arm portions FA2 and RA2 may collide with a next adjacent row of trees. To overcome this limitation, the arms FA and RA must be raised closer to the vertical, which is represented by the axis z in the system of coordinates.

One may now consider a pair of right-angle arms FA and RA in the load position 55, with the apron A supported between them, with a distal edge 63 of the apron A attached over the rim 47of the proximal sidewall PSW. In other words, the two arms FA and RA are perpendicular to their pivot Q. When the front arm FA and the rear arm RA are swung simultaneously in mutual mirroring symmetric motion, thus counterrotating, from the load position 55 to the discharge position 51, the apron A is first lifted from the ground G, folding and bulging under the load of the fruit confined therein. Further swinging, the free extremities 49 of the arms FA and RA come to their mutual closest, and past this stage, begin to unfold and then stretch the apron A. Finally, when in discharge position 51, the apron A is taut and the fruit are discharged by gravity into the open top opening OP.

Despite the considerable advantage provided by the simple concept described hereinabove, the geometry of the mechanism is not always practical. Sometimes it is desired to draw the secondary arm portions FA2 and RA2 from the primary arm portions FA1 and RA1 and to swing the arms FA and RA for a full arc of half a circle into the discharge position 51. However, the distance between consecutive rows of trees 5 is sometimes so close that the secondary arm portions FA2 and RA2 may collide with a next adjacent row of trees. To overcome this limitation, the arms FA and RA must be raised closer to the vertical, which is represented by the axis z in the system of coordinates.

With reference to FIG. 16, in an obtuse angle embodiment 2000, the description hereinbelow relates again to only the front arm FA, as explained hereinabove. The front arm FA, and a pivot Q* which is coupled thereto, are both shown to reside in the x-z plane of a system of orthogonal coordinates. However, the angle sustained between the front arm FA and the pivot Q* is now obtuse since an angle β is added to the right angle. In the x-z plane, the front arm FA still makes an angle a with the plane x-y representing the ground G, but the pivot Q* now spans an angle a+β with respect to the vertical axis z. Typically, the angle β is about 10°. Again, the front arm FA resides in the first quadrant, while the pivot Q* lies in the second quadrant, and the first point P1 on the z-axis represents the pivotally retained end 45 of the front arm FA. Likewise, the second point P2 represents the resting point of the free extremity 45 of the front arm FA with the ground G.

In load swing, the front arm FA is swung about the pivot Q* to cover an arc spanning half a circle, as described hereinabove in relation to the pivot Q, where the new swung position of the arm FA is designated as FA**. However, should the front arm FA be rotated about the pivot Q* making an obtuse angle of (90°+β) therewith, the front arm FA would then become the generatrix of a conical mantle, not shown in FIG. 16, as opposed to a circular plane described hereinabove in relation to the right-angle embodiment 1000. It is easily derived that when in discharge position 51, the free extremity 49 of the front arm FA, designated as point P3*, has risen above the ground G to a height totaling the length of the front arm FA multiplied by sine a plus the length of the front arm FA multiplied by sine (a+2β). For short: length FA time sine a plus length FA time sine (a+2β). For positive values of the angle β the height of the point P4* above the ground, which is the projection on the z-axis of the point P3*, is thus higher than the point P4 shown in FIG. 15. Thereby, in the obtuse angle embodiment 2000**, the front arm FA is closer to the vertical axis z than for the right-angle embodiment.

With reference to FIG. 17, in a cross-angle embodiment 3000, the front arm FA is extended out of perpendicular relative to the longitudinal axis of the cart C, or C200, or C300, thus in spread apart extension where the free extremity 49 of both arms FA and RA are farther away from each other than their retained end 45.

The cross-angle embodiment 3000 contrasts with the right-angle embodiment 1000, shown in FIG. 15, where in the former the arm FA is tipped, thus with a pivot Q inclined transversely toward the front F by an angle γ, in the negative direction on the y-axis. Typically, the angle γ is selected to span between 5° to 15°. This cross-angle embodiment 3000 is illustrated in FIG. 1 where both arms FA and RA are shown in the receiving position 27**, extended and spread apart away from parallel and from each other.

The cross-angle embodiment 3000 permits to enlarge the fruit receiving surface of the apron A, thus the span of the proximal edge 61 without lengthening the overall length of the cart C, or C200, or C300, which is an advantageous feature enabling better maneuvering in densely planted grooves. In other words, the length of the cart C, or C200, or C300, is shortened for the same enlarged span of the apron A. The angle γ is determined according to, among others, the type of fruit harvested, the dimensions of the foliage of the trees in a groove, the distance between two consecutive trees in a row, and the distance between the rows of trees.

Irrelevantly of the front arm FA and of the pivot Q being built as a right angle embodiment 1000, or an obtuse angle embodiment 2000, the front arm FA resides in the fourth quadrant where the x-axis is positive and the y-axis negative, and swings about the pivot Q, which is tipped out of the x-z plane into the second quadrant where the xaxis is negative and the y-axis is positive. To better illustrate the angle ?, the projection of the front arm FA on the x-y plane is shown as FAxy. Likewise, the projection of the pivot Q on the x-y plane is shown as Qxy. Along the same lines of reasoning detailed hereinabove, many combinations of the right angle, obtuse angle or cross-angle embodiments, 1000, 2000, and 3000, are feasible to suit and respond to various needs. An appropriate selection of the angles of the pivot in the cross-angle embodiment 3000 permits to achieve various swing trajectories and different discharge orientations of the front arm FA. It is thus feasible to bring the arm FA closer to the vertical than with the obtuse angle embodiment 2000, if not aligned with the vertical.

In contrast with the counter-rotating swing of the arms FA and RA described hereinabove, each one of both the front arm FA and the rear arm RA may also be implemented to operate as equi-directional-swing arms. This means that throughout the load swing and the return swing, the arms FA and RA swing simultaneously together in the same direction, thus equi-directionally. As described hereinabove, reference is made only to the front arm FA, but the same is true for the rear arm FA. For example, after the draw-in operation, the front arm FA lifts from the load position 55 by upward swing about a horizontal pivot, via the vertical, and descends by downward swing toward the discharge position 51. The return swing is completed in the reverse swing direction. In equi-directional-swing, as with counter-rotational swing, the arms FA and RA may cover half an arc of a circle, less than, or more than half an arc of circle.

The kinematics of equi-directionally-swung parallel arms is described with reference to FIG. 15, in an equi-directional embodiment 4000. The front arm FA is shown extended in parallel after the load draw, in the load position 55. However, in this embodiment the pivot Q*** is horizontal, thus in parallel to the y-axis. Still, in the x-z plane, the front arm FA makes an angle a with the plane x-y representing the ground G, and the front arm FIX resides in the x-z plane, where the x-axis is positive.

A first point P1 located on the positive z-axis above the origin O represents the retained end 45 of the front arm FA, which is pivotally coupled to, say the proximal sidewall PSW. A second point P2 represents the resting point of the free extremity 49 of the front arm FA on the ground G. This schematic illustration determines the orientation of the front arm FA when in the load position 55.

For a right angle coupling between the arm FA and the pivot Q*, the arm FA will again become the generatrix of a circular plane if rotated about the pivot Q*. Likewise, for an obtuse angle instead of a right angle, the arm FA will generate a cone mantle. More front arm FA trajectories and discharge positions are obtained for a cross-angle embodiment 3000.

For the right-angle embodiment, pivot Q is used to achieve counter-rotating swing of the arm FA, but when the pivot is oriented horizontally, such as the pivot Q***, for arms FA and RA extended in parallel, equi-directional-swing is accomplished: the arms FA and FR swing simultaneously in parallel to each other. Evidently, any practical angular orientation of the pivot and any practical angle between the arm FA and its pivot may be chosen.

It is noted that the choice of the preset angle between the arm FA and its pivot, and the orientation of the spatial angle defining the directional positioning of the pivot, permit to implement a whole range of front arm FIX swing trajectories and discharge orientations. Appropriately selected angles referring to the arms FA and RA and to their respective pivots will thus provide the desired results, according to the limitations imposed by the groove configuration and other requirements. The nomenclature selected for the description of the kinematics served the purpose of easing on the explanations. In fact, all of the hereinabove described kinematics' embodiments relating to the FIGS. 15 to 17 are the same but differ according to the orientation of the arm FA and to the angles chosen for their implementation, which angles refer to the arm-to-pivot angle and to the spatial orientation of the angles of the pivot.

The principle of operation of the apron A is the same for any out the various embodiments 1000 to 4000 described hereinabove with relation to the kinetics of displacement, when during the two-stroke operation, the arms FA and RA support the apron A along the front edge 63 and along the rear edge 65, as well as the front corner 69 and the rear corner 71.

When in the receiving position 27, the receiving face 75 of the apron A faces upward away from the ground G, whereas the ground face 73 thereof faces toward and rests on the ground G. Under the load of the fruit, a further portion of the apron A, which not yet rested on the ground, sags and comes also to rest onto the ground G.

During load draw, at the beginning of the load stroke, the fruit is confined, at least partially, in the receiving face 75 of the apron A. Once the load swing is started, the apron A is lifted from the ground G, in one bulk, by the simultaneous mutual mirroring symmetric load swing of the arms FA and RA, the arms lift the apron A which, continues to fold and further confines the fruit therein. In further load swing toward the discharge position 51, the arms FA and RA gradually unfold and stretch the apron A. The final stage is reached when the apron A is taut, thus when the swing of the arms FA and RA is stopped in the discharge position 51, at best, but not necessarily, above the open top opening OP of the cart C, C200, or C300, and distally extended away therefrom. However, it is sufficient to swing the arms FA and RA and stop in any discharge position 51 wherefrom the fruit is discharged by gravity, thus without necessarily having to bring the arms FA and RA above the open top opening OP.

During the swing from the load position 55 to the discharge position 51, the apron A sways so that the receiving face 75 of the apron ceases to face away from the ground G but is possibly tilted away from the ground G. Likewise, the ground face 73 of the apron A is lifted away and may cease to face the ground G.

Different modes of construction of draw and pivoting elements are described hereinbelow, from which a structure for the implementation of the front arm FA and of the rear arm RA is selected, according to requirements and needs.

Mechanisms for the draw of the arms FA and RA in translation are described, and so are mechanisms for draw by pivoting. Both types of draw mechanisms are practical for any of the embodiments 100, 200, and 300.

FIGS. 6 and 7 depict the arms FA and RA implemented each as an elongated slender telescopic boom having a free end and a boom retained end 45 pivotally coupled to the cart C, C200, or C300. Each telescopic boom is a hydraulic boom cylinder 101, forming the primary arm portions FA1 and RA1, with a boom free end 103 from which a boom piston 105, forming the secondary arm portions FA2 and RA, with a boom piston extremity 107, are controllably extended and retracted. In the receiving position 27 shown in FIG. 6, both arms FA and RA, thus the primary arm portions FA1 and RA1 and the secondary arm portions FA2 and RA2 are fully extended in parallel, and the apron A is stretched. Load draw retracts the boom pistons 107, after which the apron A resides in partial extension only, thus partly folded.

When extended in receiving position 27, the apron A presents a generally quadrilateral surface with a distal edge 63 fastened to and covering the rim 47 of the proximal sidewall PSW. The proximal edge 61 of the apron A, opposite the distal edge 63, is a straight free edge. Each one of the front corner 69 and the rear corner 71 is fixedly retained to the boom piston extremity 107 of a separate corresponding boom piston 105. Each one of the front edge 65 and the rear edge 67 of the apron A, connecting between the distal edge 63 and the proximal edge 61, is fixedly attached along the whole length of the boom cylinder 101, from the pivoted boom retained end 45 of the boom cylinder 101 to the boom free end 103. The portion of the front edge 65 and of the rear edge 67 of the apron A, spanning from the boom free end 103 of the boom cylinder 101 to the boom piston extremity 107 of the boom piston 105, forms a sleeve around the boom piston 105, or is coupled thereto via rings attached to the apron A and fitting over the boom piston 105, instead of being solidly connected thereto. This arrangement permits sliding whereby it is possible to retract and extend the boom pistons 105 without tearing the apron A, which will then fold when the boom pistons 105 retract.

For the three embodiments 100, 200 and 300, when the arms FA and RA are spread with the apron A in receiving position 27, they are fully extended and hang freely, sloping down toward the ground G, pivotally retained at their retained end 45, and distally away from the proximal sidewall PSW. The front arm FA hangs from the front portion 33 of the cart C, C200, or C300, and the rear arm RA from the rear portion 35 of the cart. The boom free end 103 of each one of the boom cylinders 101 hangs above the ground G, but the boom piston extremity 107 of each one of the boom pistons 105 is configured to rest on the ground.

FIG. 6 depicts a boom cylinder 101 configuration, where the boom piston 105 is short relative to the cylinder, for example about 3 m for the boom cylinder 101 and 0.85 m for the boom piston 105. The cart C, C200, or C300, is about 6 m long, to easily accommodate maneuvering in grooves.

According to another embodiment of the present invention, each one of the front and rear arms FA and RA is implemented as a unitary arm, without any retractable or folding portion. In such case, the retained end 45 of each one of the arms FA and RA is pivotally coupled to the cart C, C200, or C300, and the free extremity 49 of each one of the arms FA and RA is configured to rest on the ground G when fully extended away from the proximal side of the cart. Evidently, only counter-rotating swing is possible.

Other configurations, with a whole span of different cylinder to piston ratio are feasible, such as for example, cylinder to piston ratios of 3:1, 2:1, and 1:1. Regardless of the cylinder to piston ratio, the arms FA and RA are not necessarily swung in counter rotation swing, but may swing about a horizontal pivot, thus in equi-directional swing, or any intermediary swing trajectory, and achieve the same fruit collection results.

In the field, the ground G is far from being a perfectly horizontal plane, since terrain usually contains bumps, obstacles such as branches and stones, holes and furrows. Therefore, it may happen that when the boom cylinder 101 is fully extended proximally, the boom free end 103 thereof hits the ground G instead of being elevated therefrom. To overcome this limitation, the spatial attitude of the cart C, C200, or C300, is oriented and adjusted as described hereinabove by independently controlling the elevation of the hitch H and of the cart-lift mechanism 77 operating on each one of the wheels WP and WD. Thereby, the primary arm portions FA1 and RA1, here the boom cylinders 101, can be fully and freely extended to the proximal side and hang above the ground G while each one of the respective secondary arm portions FA2 and RA2, here the boom pistons 105, may be extended down to the ground G and rest thereon. All the attitude correction adjustments achieved by control of the hitch H and of the cartlift mechanism 77 operating on each one of the two wheels WP and WD are controlled by the driver of the tractor 21, who is the sole operator of the fruit collection system 1.

The arms FA and RA are not necessarily implemented with a boom cylinder 101 and a boom piston 105, but other mechanisms are also practical. For example, the boom piston 105 may be replaced by a secondary front arm portion FA2 made as a screw threaded rod (not shown in the figures), in screw threaded engagement with a corresponding screwthread accommodated in a primary front arm portion FA1 that replaces the boom cylinder 101, with the same arrangement for the rear arm RA. By rotating the threaded rod in either direction with respect to the primary front arm portion FA1, an inward or outward displacement, or draw, of the threaded rod is obtained.

Another draw mechanism for the translation of the secondary arm portions FA2 and RA2 utilizes a gear wheel in engagement with a guided tooth rack (not shown in the figures). A rotatable gear wheel is attached to the free end of each primary arm portion FA1 and RA1, and an appropriately guided tooth rack in corresponding engagement with the rotatable gear wheel is fixedly attached to each one of the secondary arm portions FA2, RA2, or vice versa. When the gear wheel is rotated, the attached and engaged tooth rack is compelled to translate as guided, together with the corresponding attached secondary arm portion FA1 and FA2. There is thereby provided a translation relative to the primary arm portions FA2 and RA2, either in extension or in retraction.

The types of mechanisms for draw by pivoting, described hereinbelow, are practical not only for the draw of the secondary arms portions FA2 and RA2, but also for the swing of the primary arm portions FA1 and RA1, and are applicable to any of the embodiments 100, 200, and 300.

Figure 18:
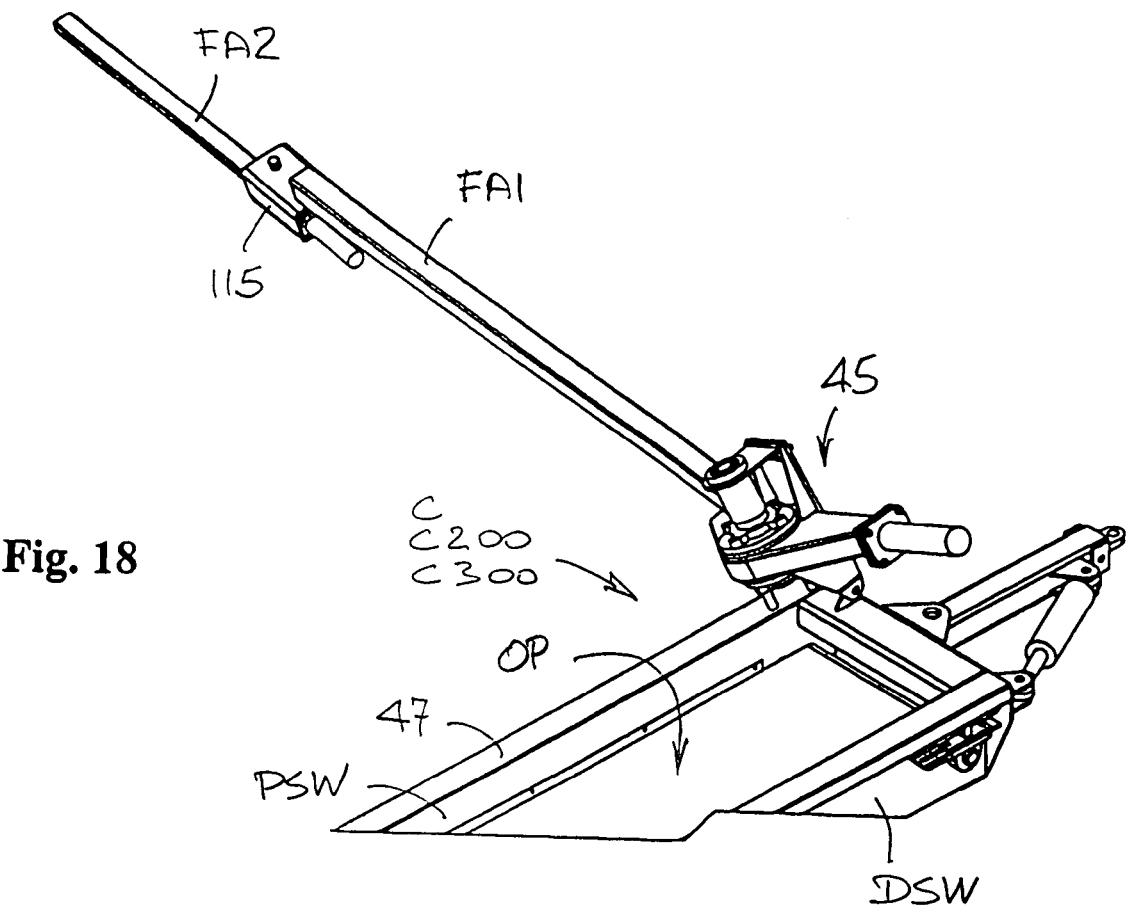
FIGS. 18 and 19 depict two extreme positions of one pivotal draw mechanism.
Figure 19:
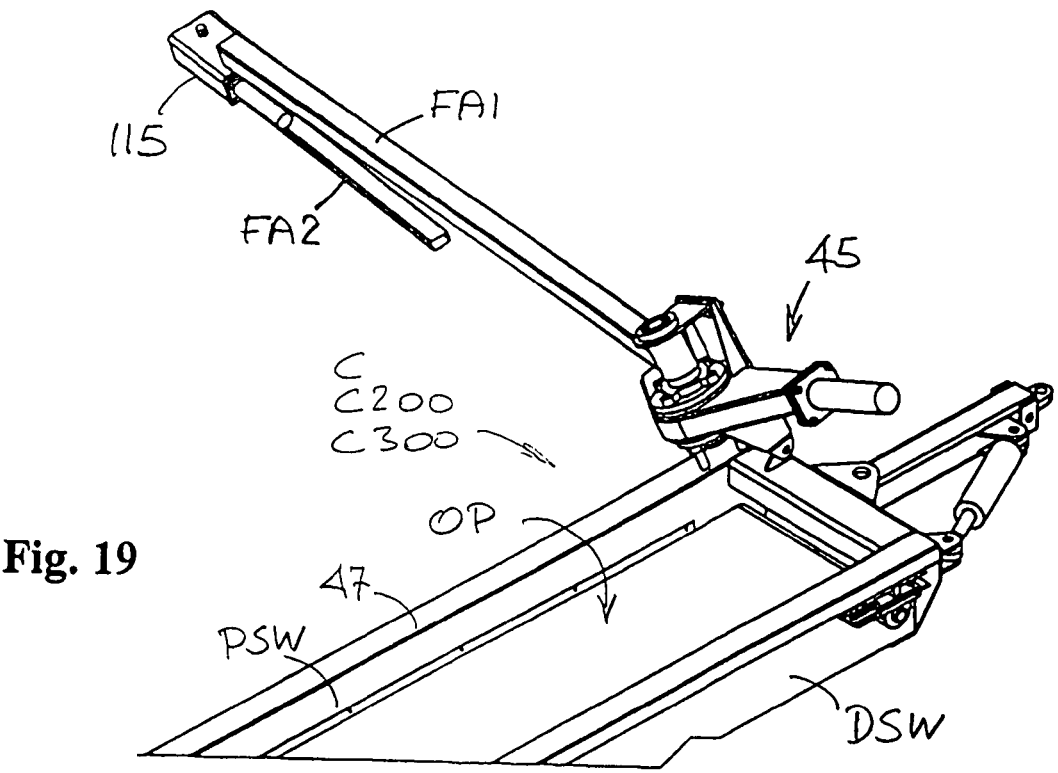

For draw by pivoting, each one of the secondary arm portions FA2 and RA2 pivots through an arc of circle of some 180° about a pivot located on their respective supporting primary arm portion, namely FA1 and FA2. The secondary arm portions FA2 and RA2 thus fully drawn out in substantial co-directional alignment with their respective primary arm portions FA1 and RA1, as illustrated in FIG. 18, and are drawn-in by pivoting to a generally side-by-side fold-over position, as depicted in FIG. 19.

In principle, a roller chain translated by opposite-stroke hydraulic pistons, which are attached to a primary arm, engages a sprocket wheel affixed to a secondary arm, to swing the secondary arm.

Figure 20:
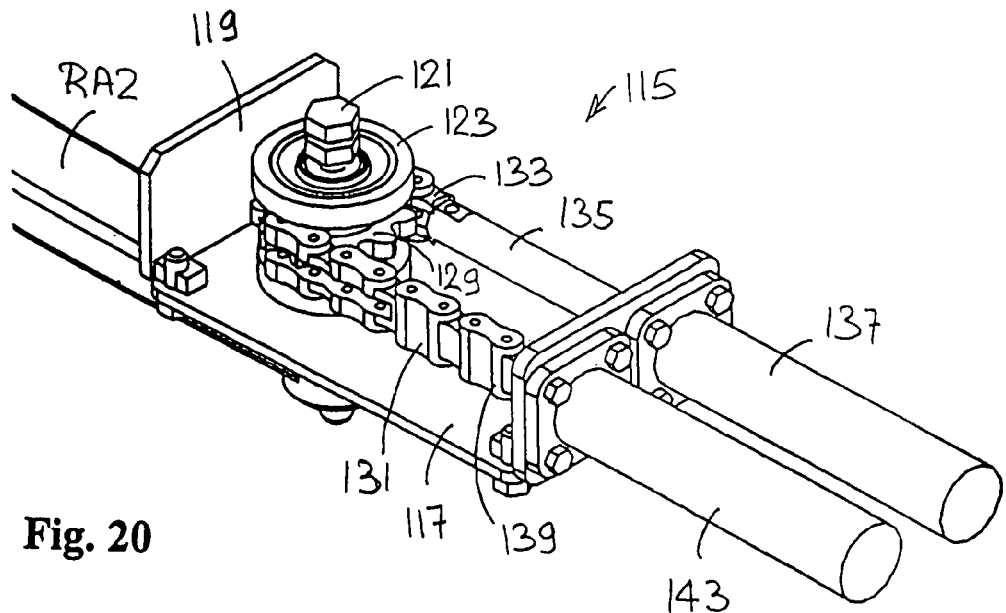
FIGS. 20 and 21 illustrate two different pivoting mechanisms.

A swing chain-mechanism 115 for each one of the secondary arm portions FA2 and RA2 is best seen in FIG. 20. To ease the description of the structure and of the pivoting chain-mechanism 115, the latter is shown with its cover removed. Since the chain-mechanism 113 for both arms FA and RA is similar, only one arm, namely the rear arm RA is described hereinbelow. The chain-mechanism 115 rests on a support frame 117, fixedly attached to the free end 119 of the primary arm portion RA1. An appropriately oriented shaft 121, thus with a selected spatial angle, forms the pivot with a first upper portion thereof being supported by bearings 123 to the support frame 117. The secondary arm portion RA2 is fixedly attached to a second lower portion of the pivot extending downwardly to pivot together therewith.

A sprocket wheel 129 is integral with the shaft 121 to pivot therewith. A roller chain 131, hereinbelow the chain 131, adapted to engage the sprocket wheel 129, envelopes about half the periphery thereof and extends away therefrom to present two separate connected chain ends. A first chain end 133 of the chain 131 is connected to a first chain piston 135 of a first extending hydraulic chain cylinder 137. A second chain end 139 of the chain 131 is connected to a second chain piston 141, not seen in FIG. 20, of a second retracting hydraulic chain cylinder 143. It is noted that the two chain cylinders 137 and 143 are of the same construction and the definitions "extending hydraulic cylinder" and "retracting hydraulic cylinder" alternate and refer only to their function with respect to the actual operation of the secondary arm portion RA2.

In operation, the two chain cylinders 137 and 143 act simultaneously but in opposite directions. That is, when the second retracting chain cylinder 143 retracts its second chain piston 141 for a full stroke inwards, then the first extending chain cylinder 137 extends its first chain piston 135 outwards for the same stroke length as provided by the second chain piston 141. The outward extension of the first chain piston 135 is provided either by hydraulic pressure forced extension, applied by the extending first chain cylinder 137, or is an idle extension, when the retraction of the second chain piston 141 of the retracting second chain cylinder 143 pulls the first chain piston 135 outward, by means of the chain 131.

Thus, by taking advantage of the opposite translation direction of the two chain pistons 135 and 141, the chain 131 pivots the sprocket wheel 129 and hence the shaft 121. The arc through which the shaft 121 pivots is determined by the radius of the sprocket wheel 129 and by the stroke of the chain cylinders 137 and 143. Typically, the arc of pivoting is half a circle. Since the secondary arm portion RA2 is connected to the shaft 121, operation of the chain cylinders 137 and 143 pivots the secondary arm portion RA2 from an extracted position, as shown in FIG. 18, to a retracted or folded position, as shown in FIG. 19, and vice versa.

Although described with respect to the draw of the secondary arm portions FA2 and RA2, the chain-mechanism 115 is practical for the swing of the primary arm portions FA1 and RA1.

The mechanism described hereinbelow is related to the swing of the primary arm portions FA1 and RA2, although it may be implemented for the draw of the secondary arm portions FA2 and RA2.

Figure 21:
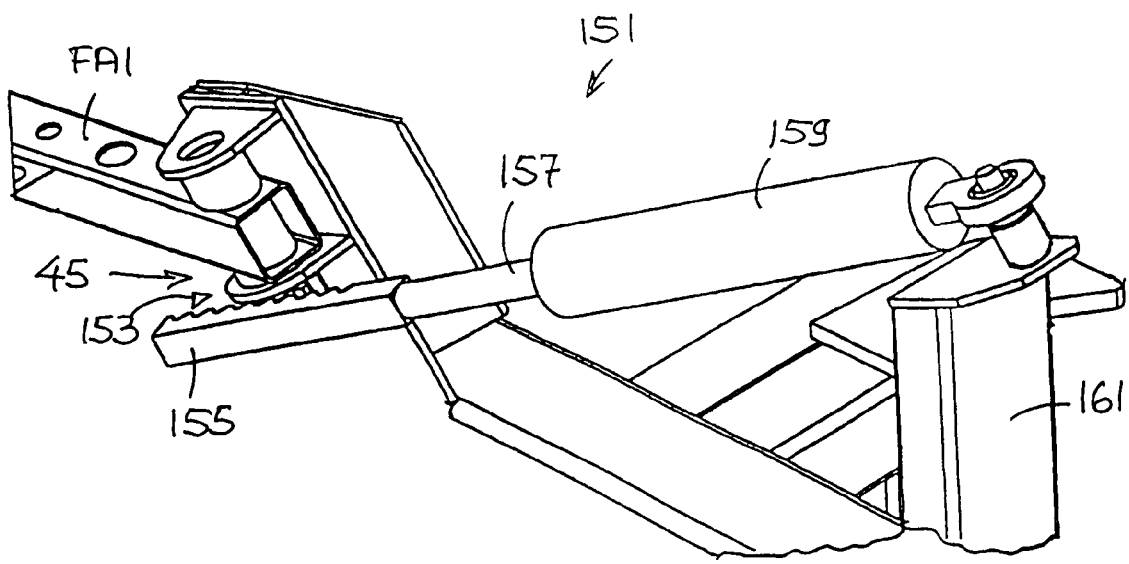

In principle, a tooth rack coupled to the cart C, C200, or C300, is driven by a hydraulic piston to engage a tooth wheel affixed to the arm, to swing the arm. A rack-mechanism 151, seen in FIG. 21, is affixed to, for example, each one of the corners of the proximal sidewall PSW, or to a support structure coupled to the cart C, C200, or C300. As described only for the primary front arm portion FA1, since it is similar to the rear arm portion RA1, the pivoting mechanism comprises a tooth wheel 153 attached to the retained pivoting end 45 of the primary front arm portion FA1. A tooth rack 155, operated by a jack-piston 157 of an arm-swing jack 159, engages the tooth rack 155. The arm-swing jack 159 is pivotally coupled to a structure 161 on the cart C, C200, or C300. Swing motion of the front primary arm portion FA1 is achieved by extending and retracting the jack-piston 157, respectively, out and into of the arm-swing jack 159.

With the draw by pivoting mechanisms, the front and rear edges 65 and 67 are fixedly attached to both the primary and the secondary arm portions of the front arms FA and RA. As the secondary arm portions just fold over the primary arm portions, there is no relative motion between the front and the rear edges 65 and 67 of the apron A with respectively, the front and the rear arms FA and RA. This contrasts with the translation mechanisms described hereinabove, where the front and rear edges 65 and 67 were made to slide over the secondary arm portions FA2 and RA2.

Reference is now made to FIGS. 1 to 5 for the description of the operation of the first embodiment 100 of the fruit collection system 1, which is shown in receiving position 27 in FIGS. 1 and 3. At least a portion of the pliable apron A is spread-out on the ground G, in the receiving position 27, under at least one portion of the foliage FOL of the tree T. According to needs, at least a portion of the apron A may rest on the first and the second row-side, 7 and 9. The apron has a ground face 73 that faces the ground during harvesting, and a receiving face 75 opposite the ground face, for receiving the harvested fruit thereon. The fruit is thus received on the receiving face 73 of the apron A, whereafter the apron folds over the fruit, which is discharged together in one bulk. The apron is hung and taut between the arms FA and RA, which are extended in spread-apart extension, and may reach under the foliage FOL of the tree preceding, and of the tree following, the tree T to be harvested.

As described hereinabove, immediately after completion of harvest of a tree T, the apron A is drawn in load draw, at least partially, and then swung, in load swing, to the discharge position 51, shown in FIG. 7 as position IV, and in FIG. 14, where the fruit is discharged by gravity into the open top opening OP. The apron A is supported by a front arm FA and by a rear arm RA in draw and swing, for operation in load stroke and in return stroke. Although various apron A and arms FA and RA configurations are practical, the principle of an apron A being drawn and swung by two arms remains the same for the three embodiments 100, 200, and 300.

The collection system 1 is not compelled to discharge the collected fruit opposite the harvested tree T. Rather, upon completion of harvesting of a tree T, the collection system 1 leaves the receiving position opposite the tree and moves to enter receiving position opposite a following tree. This is possible as soon as the secondary arm portions FA2 and RA2 are drawn to reside on the second row-side. Thereby, the dwell time of the collection system for fruit collection opposite a tree is minimal.

The different embodiments and configurations are intended to provide an appropriate response to the limitations encountered in the field. Such limitations are imposed mainly by the distances existing between successive trees and rows in a groove, as well as by the type of fruit being collected.

It is thus possible to select a spatial angle for directionally positioning a pivot forming the pivotally coupled retained end 45 of each arm FA and RA. The pivot of each arm FA and RA is evidently oriented to maintain mutual mirroring image symmetry of the arms FA and RA of collection device 26. When both the spatial angle and the preset angle for coupling between each arm and its respective pivot are selected, it is possible to define a multitude of predetermined trajectories, to satisfy needs in the field. For example, trajectories are obtained where the arms FA and RA swing in counter-rotation, in equi-directional rotation, and in combinations thereof, according to the appropriate selection. Moreover, the swing of the arms FA and RA may cover chosen arcs, such as half a circle, less then half a circle, and more then half a circle.

The fruit discharged into the open top opening OP of the cart C, C200, or C300, lands on the bottom conveyor 11, which is configured to transfer the fruit to the lifting conveyor 13. A ridged belt carrying flexible protrusions 171, a indicated in FIG. 3, and spanning the width of the lifting conveyor 13, elevates the fruit from the rear end 173 of the horizontal conveyor 11, to the top 175 of the lifting conveyor. From over the top 175 of the lifting conveyor 13, the fruit falls by gravitation into the fruit collector 15.

In the embodiments 100 and 200, although not always shown in the FIGS., the fruit dropping from the lifting conveyor 13 is met on its way by a jet of air blown by a fan 177, which is attached at the rear 179 of the lifting conveyor, as seen in FIGS. 1, 3, 6, and 8 to 10. The purpose of the jet of air is to divert debris, like leaves and twigs shaken off the tree together with the fruit, from falling into the fruit collector 15. In addition, but not shown in the FIGS., rotating brushes, accommodated either in line with the lifting conveyor 13, or laterally thereto, enhance the rejection of leaves and twigs.

In the embodiment 100, the fruit collector 15 is a trailer 17 configured as a mechanized open-top wagon riding on two trailer wheels 183. The trailer 17 is towed in alignment behind the cart C by means of a trailer hitch 185. The main elements of the trailer 17 are a trailer body 187 supporting a cage 189 wherein fruit is collected, two body-lifting units 191 to lift the trailer body 187, a translation device 193, and a tilting unit 195, best seen in FIG. 5.

The cage 189 is built as a box with a cage top opening 197. The cage 189 has a flat bottom 199, to which a box front wall 201 opposite a slanting box rear wall 203, and two box sidewalls 205 are fixedly attached to define the cage top opening 197. The cage 189 is substantially of parallelepiped shape, but for the slanting box rear wall 203, which is hinged by a rear cage pivot 207 to a trailer body rear upper extremity 209, whereby the cage 189 is tiltable toward the rear R about the trailer body rear upper extremity 209.

During operation of the bottom conveyor 11 and of the lifting conveyor 13, the trailer 17 is retained coupled adjacent to and in alignment with the cart C, in a filling position 211, as seen in FIGS. 1 to 3 for example, so that the front wall 201 of the cage 189 resides below the top 175 of the lifting conveyor 13. Fruit falling from over the top 175 of the lifting conveyor 13 thus drop to the inside of the cage 189, which is seated on the trailer body 187.

The translation device 193, such as a hydraulic cylinder-and-piston unit, which is attached at one end, to the front of the trailer body 187, and at the second end to the trailer hitch 185, couples between the cart C and the trailer 17, in a first pulledin position 213, seen in FIGS. 2, 4, and 5, and in a second pulled-away position 215, shown in FIGS. 4 and 5. The translation device 193 maintains the trailer 17 in the filling position 211, when in the first pulled-in position 213, but spaces the trailer 17 away to the rear from the cart C to the second pulled-away position 215. In the pulled-away position 215, the box front wall 201 is distanced to the rear away from under the lifting conveyor 13, leaving sufficient clearance between the cage 189 and the lifting conveyor 13 to lift the trailer body 187 and to tilt the cage to the rear out of the trailer body 187, about the rear cage pivot 207.

One body-lifting unit 191, such as a hydraulic cylinder-and-piston unit, is coupled between each trailer wheel 183 and the trailer body 187, and operates simultaneously to lift and lower the trailer body 187. Hence, the body-lifting units 191 may lift the trailer body 187, together with the cage 189 supported thereby, to an elevated position 219, as shown in FIGS. 4, or remain in a lower position 221, as when in the pulled-in position 213 shown in FIG. 1 to 3. Lifting the trailer body 187 into the elevated position 219 is intended to raise the rear cage pivot 207 above the height of the open top load box 21 of a truck 23, to facilitate unloading of the fruit by gravity from the cage 189, into the open top load box.

The tilting unit 195, such as a hydraulic cylinder-and-piston unit, is operative to unseat the cage 189 out of support from the trailer body 187, and to tilt the cage 189 to pivot about the rear cage pivot 207, into the unloading position 219.

In operation, when the cage 189 has been filled with fruit delivered thereto by the lifting conveyor 13, the collection system 1 is stopped. The tractor 3 is halted, and so are the bottom conveyor 11 and the lifting conveyor 13. The translation device 193 is now operated to translate the trailer 17 to the pulled-away position 215, as by FIG. 4, and next, the bodylifting units 191 raise the trailer body 187 into the elevated position 219. In turn, the truck 23 is now driven in place with the open top load box 21 positioned appropriately to receive the fruit unloaded from the tilted cage 189 into the load box 21. The load box 21 must thus be driven below and under the rear upper extremity 209 of the trailer body, as seen in FIG. 5. In a next step, the cage 189 is pivoted by the tilting unit 195 into the unloading position 219, for the fruit to drop by gravity into the load box 21. Once loaded, the truck 23 is driven away, while the trailer 17 resumes the filling position 211 by retracing the steps taken to reach the unloading position 219. The cage 189 is thus tilted forward and seated into the trailer body 187, thereafter the trailer body is lowered to the lower position 221, and finally, the trailer 17 is translated to the pulled in position 213. The collection system 1 may now be activated to resume operation.

In combination with the tilting cage 189, the body-lifting units 191 are of noticeable value since they permit to raise the cage 189 and take advantage of trucks 23 with large capacity load boxes 21, which are usually rather high above the ground G. Conventionally, flat-bed trucks with limited fruit holding capacity were used in the field. Now however, the elevation of the fruit-containing cage 189 high above ground G, allows the use of larger trucks 23, carrying load boxes of considerable fruit loading volume.

Figure 8:
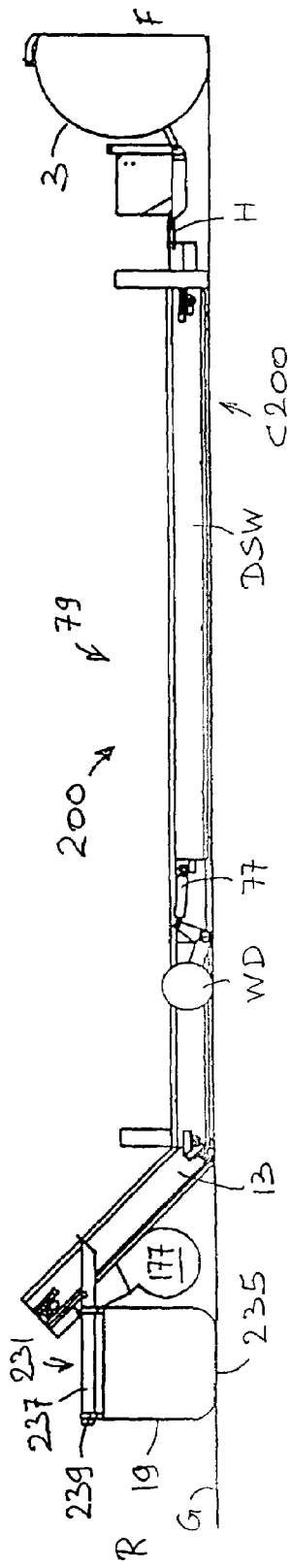
FIGS. 8 to 10 are side views of the embodiment 200, in various stages of discharge.

Reference is now made to FIGS. 6 to 8 for the description of the operation of the second embodiment 200 of the fruit collection system 1, which is shown in receiving position 27 in FIG. 6. The unitary apron A is depicted as being spread-out, partially on the ground G, and taut between the arms FA and RA, which are extended in parallel as seen in FIG. 6, although they may as well be extended in spread-apart extension, as shown in FIG. 1.

Regarding the apron A, the arms FA and RA, the bottom conveyor 11 and the lifting conveyor 13, supported by the cart C200, the embodiment 200 is similar to the embodiment 100 with the cart C. As described hereinabove, starting from the receiving position 27, after harvest of the fruit, the apron A is drawn and swung to the discharge position 51, where the fruit is discharged by gravity into the open top opening OP of the cart C200. The apron A is supported by the arms FA and RA in draw and swing, which operate in a load stroke and in a return stroke. Although various apron A and arms FA and RA configurations are practical, the principle of an apron A being drawn and swung by two arms remains the same for the three embodiments 100, 200, and 300. The different embodiments and configurations are intended to provide a response to the limitations encountered in the field. Such limitations regard mostly distances between trees and rows in a groove, as well as the type of fruit being collected.

The fruit discharged into the open top opening OP of the cart C200 lands on a horizontal bottom conveyor 11, which is configured to transfer the fruit to the lifting conveyor 13. A ridged belt carrying flexible protrusions 171 seen in FIG. 3, and spanning the width of the lifting conveyor 13, elevates fruit from the rear end 173 of the horizontal conveyor 11, to the top 175 of the lifting conveyor. From over the top 175, the fruit falls by gravitation into the fruit collector 15.

Figure 9:
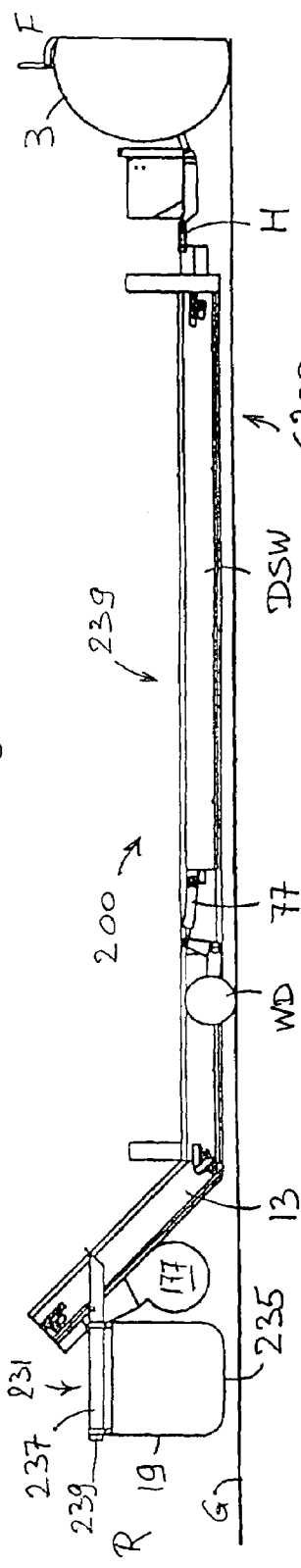
Figure 10:
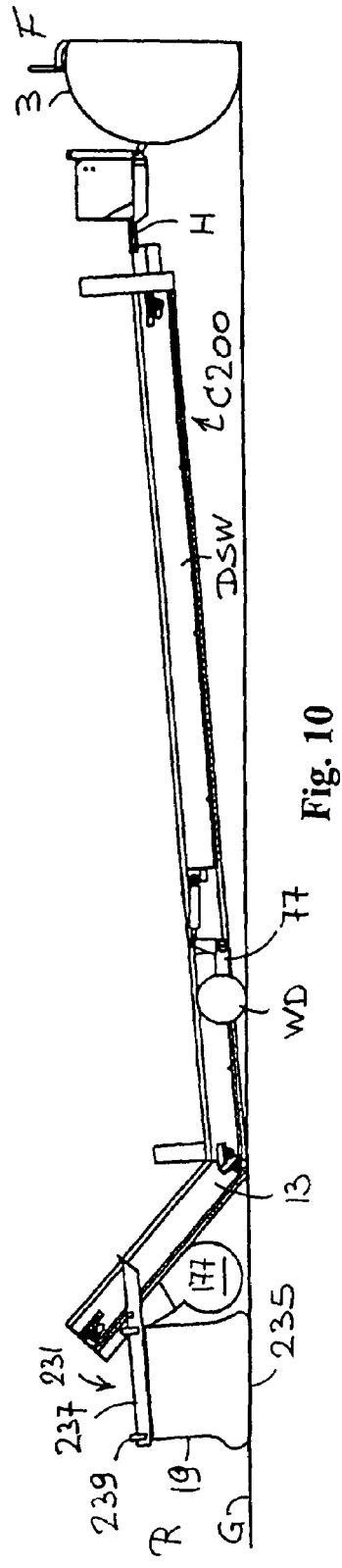

Reference is now made to FIGS. 8 to 10. Fruit dropping from the lifting conveyor 13 is met on its way by a jet of air blown by a fan 177 attached at the rear 179 of the lifting conveyor. The purpose of the jet of air is to divert debris, like leaves and twigs shaken off the tree together with the fruit, from falling into the fruit collector 13. In addition, but not shown in the FIGS., rotating brushes, accommodated either in line with the lifting conveyor 12, or laterally thereto, enhance the rejection of leaves and twigs. The configuration of the fan 177 and of the brushes are common to the cart C and to the cart C200, although not described hereinabove with reference to the embodiment 100.

In the embodiment 200, the fruit collector 15 is a container 19, either rigid or flexible. The container 19 has a container top opening 231, a pair of loops 233 erect and standing upward and affixed in opposite to each other on the periphery of the top opening, and a container bottom 235. The container 19 is supported to the rear of the fan 177, below the top 175, and to the rear of the lifting conveyor 13, by a pair of prongs 237, solidly attached to the cart C200 and accommodated for engaging the loops 233.

In FIG. 9, the cart C200 is shown in a riding position 239, with the container bottom 235 supported above the ground G by the pair of prongs 235. When the container 19 is full, the collection system is halted, the bottom conveyor 11 and the lifting conveyor 13 are stopped, and the container is unloaded for replacement by an empty container 19. To unload and replace the fruit-filled container 19 by an empty container, the fruit-filled container must first be lowered to the ground G. The process of unloading the container 19 is performed by the driver of the collection system 1, by sole operation of controls, thus without manual intervention. To this end, the hitch H is commanded to lift, whereby the cart C200, pivots about the proximal and the distal wheels, respectively WP and WD, as shown in FIG. 10. The rear R of the cart C200, behind the proximal and the distal wheels, respectively WP and WD, thus descends to the ground G, as well as the container 19. When the container bottom 235 rests firmly on the ground G, the prongs 237 release their tension on the open loops 223 that remain upright. The cart C200 may now be driven away, whereby the prongs 237 slide out of the loops 233. With reference to FIG. 8, an empty container 19 is now mechanically loaded by first lowering the cart C200 to the ground G, which is achieved by operation of the hitch H and of the cart-lift mechanism 77. Next, the cart C200 is pushed to the rear R to drive the prongs 237 into the open loops 233 of the container 19 appropriately positioned on the ground G. Else, a container 19 is loaded manually onto the prongs 237. The collection system 1 is now started to continue operation.

Reference is now made to FIGS. 11 to 14 for the description of the operation of the third embodiment 300 of the fruit collection system 1, shown in the Figs. without the unitary apron A, for the sake of clarity. The configuration presented by the embodiment 300 is best suited for the collection of fruit such as almonds, which are harvested and spread as a flat trail on the ground G, not shown in the Figs., where they are left to dry, before being gathered and transported away.

The fruit collection system 1 is shown in FIG. 11 in receiving position 27. Actually, the unitary apron A is partially spread on the ground G, and taut between the front arm FA and the rear arm RA, which are extended in parallel, although they may as well be extended in spread-apart extension, as shown in FIG. 1.

The cart C300 is shown to sustain an apron ramp 43, which is adjustably attached to the proximal sidewall PSW, and an adjustable retaining wall 41, supported by the distal sidewall DSW in distally slanting orientation above and away from the cart C300. Although not shown in the FIGS. 1 to 10 illustrating the embodiments 100 and 200 for the sake of clarity, the ramp 43 and the retaining wall 41 are also present and operative on the carts C and C200.

The apron ramp 43, or ramp 43 for short, is attached to a middle portion of the proximal sidewall PSW, to the front of the proximal wheel PW and to the rear of the cart front portion 33, in sloping down orientation, proximally away from the rim 47 toward the ground G. The ramp 43 helps to reduce the tear and wear imposed on the ground face 73 of the apron A, when the apron is stretched to lift above the proximal sidewall PSW, during the load swing toward the discharge position 51. The slope of the ramp 43 is adjustable to suit needs and according to the configuration selected for the arms FA and RA performing the draw and swing.

The adjustable retaining wall 31 stretches along the whole length of the cart C300, in adjustable distal slant above the distal sidewall DSW, to prevent the loss of fruit in general, without restriction to almonds. The retaining wall 41 is utilized as a deflector when the harvester shakes the tree T, to retain fruit flung distally and guide it into the cart open top opening OP, instead of being lost distally away over the cart C300.

Regarding the apron A, and the arms FA and RA, the embodiment 300 is similar to the embodiments 100 and 200. As described hereinabove, starting from the receiving position 27, after harvest of the fruit, the apron A is drawn and swung to the discharge position 51, where the fruit is discharged by gravity into the open top opening OP of the cart C300. The apron A is supported by the arms FA and RA in draw and swing, which operate in a load stroke and in a return stroke. Although various configurations of the apron A and of the arms FA and RA are practical, the principle of an apron A being drawn and swung by two arms remains the same for the three embodiments 100, 200, and 300. The different embodiments and configurations are intended to provide a response to the limitations encountered in the field. Such limitations regard mostly distances between trees and rows in a groove, as well as the type of fruit being collected.

The cart C300 of the third embodiment 300 is devoid of a bottom opposite the cart top opening OP. The fruit discharged into the open top opening OP of the cart C300 falls to the ground G in a heap, via the open bottom passage 25, before being leveled into a flat trail. Evidently, both the bottom conveyor 11 and the lifting conveyor 13 are not present in the cart C300.

At the rear of the cart C300, a spreader 305 is affixed to the rear wall RW, in adjustable rearward slope and in adjustable height above the ground G, to spread the fruit evenly on the ground, as a flat trail. The spreader 305 is possibly mounted on wheels rolling on the ground G, behind the cart C300.

Figure 12:
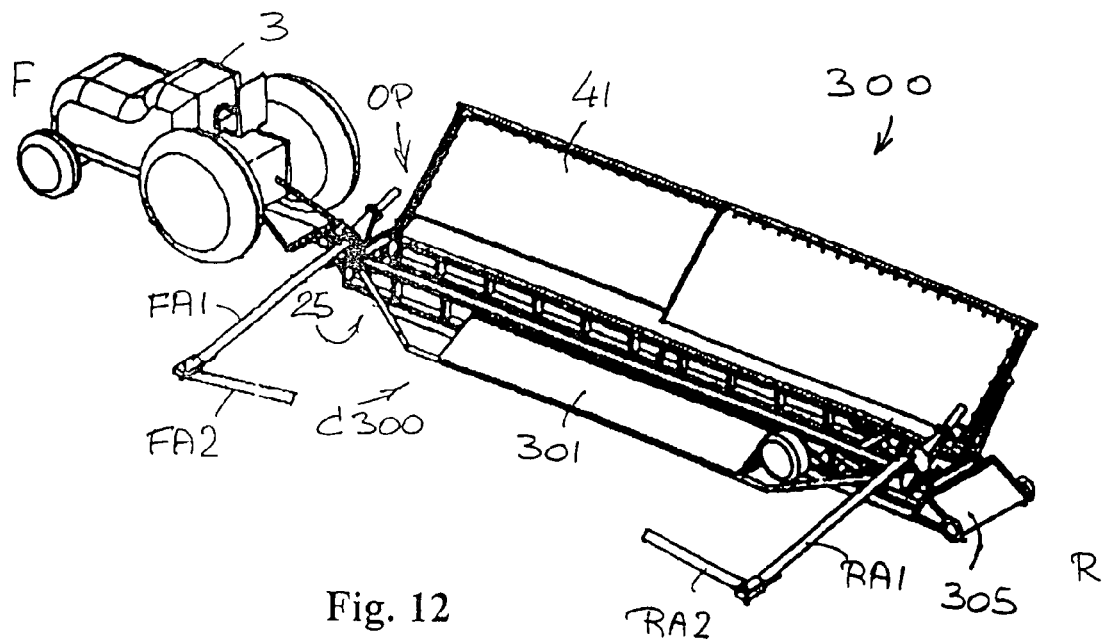
Figure 13:
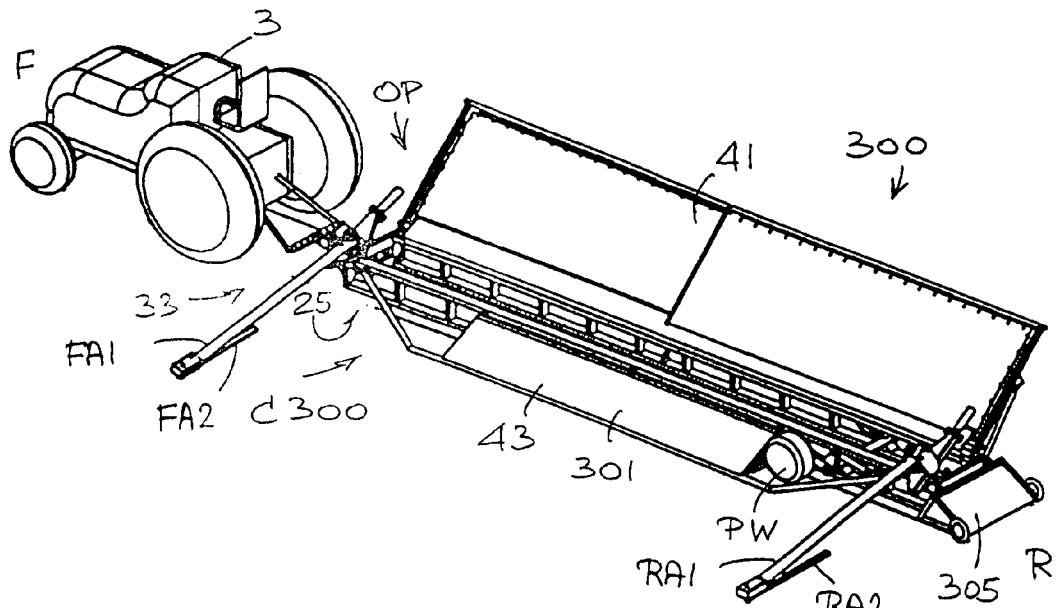

FIG. 11 shows the arms FA and RA in receiving position 27, while FIG. 12 depicts the first stage of load draw, with both the secondary arm portions FA2 and RA2 starting to fold toward the cart C300. The apron A, not shown in FIGS. 11 to 14, starts to fold over and partially confine the fruit therein. In FIG. 13, load draw, depicted as pivoting foldover, but possibly retracting in translation, is completed and the arms FA and RA are positioned at the beginning of the load stroke. In turn, FIG. 14 depicts the discharge position 51, with the arms FA and RA residing over the open top opening OP of the cart C300. It is noted that in the discharge position 51, the primary arm portions FA2 and RA2 are not drawn-out, but still, the fruit is discharged by gravity from the apron A into the open top opening OP of the cart C300, even though only a portion of the apron is taut but the entirety of the apron is not stretched out. In fact, it is sufficient for only the portion of the apron A residing between the primary arms FA1 and RA2 to be taut for discharge by gravity, irrelevantly of the state of tension of the portion of the apron supported between the secondary arms FA2 and RA2.

The collection system 1 is operated on the second row side of a row of trees 5, in association with a harvester supporting a deflector, which runs on the first row-side. For operation, the cart C, or C200, or 300, is lifted above ground into the traveling configuration 81, shown in FIG. 9 for the cart C200, by operation of the cart lifting mechanism 77 and of the hitch H. The arms FA and RA may reside in any position but the receiving position. It is noted that the low, slender and narrow silhouette of the equipment is configured to facilitate passage between the rows of trees 5.

The collection system 1 is then stopped at appropriate distance opposite the tree T to be harvested, and the cart C, or C200, or C300, is lowered to rest on the ground G, as shown in FIG. 8 and which illustrates a harvesting configuration 79 for the cart C200. Should the cart not be conveniently oriented, then the cart lifting mechanism 77 and the hitch H are commanded to provide the desired orientation. Next, the arms FA and RA are controlled to swing and draw to the receiving position 27.

With the apron A in place on the ground G, the shaker may now harvest the tree T. The fruit falling from the tree T on the side of the harvester, thus on the first row side, impacts on the deflector, supported by the harvester and located above the apron A, which guides the fruit towards the apron A. When harvesting is completed, the shaker and the deflector travel to the next tree T to be harvested.

After harvesting of the tree T is completed, the apron A is drawn at least partially, for the apron to reside on the second row-side. The cart C, or C200, or C300 is then lifted to the traveling configuration 81, and the collection system 1 may be driven opposite the next tree T to be harvested, while completing draw and swinging to the discharge position 51 while under way.

Fruit gathered in the apron A is discharged into the open top opening OP of the cart C, or C200, and further conveyed to the fruit collector 15 for the embodiments 100 and 200, or spread on the ground G for the embodiment 300. The fruit collection operation may now start for another tree by driving the cart C, or C200, or C300, opposite a following tree. It is noted that the harvesting and collecting process according to the present invention lasts between 15 to 30 seconds for each tree. In practice, as much as 1200 almonds trees are harvested during an eight-hour working shift. The fruit collection process described hereinabove may be implemented for almonds, nuts, olives and citrus fruit, and practically for any kind of fruit trees.

The present invention is applicable in agriculture for gathering and collecting fruit harvested from trees, and, in particular, fruit shaken from trees. It will be appreciated by persons skilled in the art, that the present invention is not limited to what has been particularly shown and described hereinabove. For example, the collection system 1 is operable on isolated trees T, and not restricted for use solely with trees in rows 5. Furthermore, if advantageous, the operation of the arms FA and RA is not limited to simultaneous draw and swing, as long as the desired results are achieved. Rather, the scope of the present invention is defined by the appended claims and includes both combinations and subcombinations of the various features described hereinabove as well as variations and modifications thereof which would occur to persons skilled in the art upon reading the foregoing description.

What is claimed is:

1. A method for operating a collection system for collecting fruit harvested from the foliage of a tree planted in a row of trees having a front, a rear, a first row-side, and a second row-side, and having on the first row-side, a harvesting unit with a tree-fruit harvester for harvesting fruit from the tree into a cart, and a deflector for guiding fruit harvested mainly on the first row-side to the second row-side, the method comprising the steps of:
   on the second row-side:
      spreading at least one portion of a pliable apron on the ground to reach under the deflector in a receiving position, and under at least one portion of the foliage of the tree, the apron having a ground face that faces the ground during harvesting, and a receiving face opposite the ground face, for receiving the harvested fruit thereon,
      receiving the fruit directly on the receiving face of the apron, and from the deflector, and
      folding the apron and discharging the fruit together in one bulk into the cart.

2. The method according to claim 1, wherein:
   the apron is configured as a single piece unit of substantially quadrilateral shape, including a proximal edge closer to the tree, with a middle edge portion disposed between a front corner to the front, and a rear corner to the rear, a distal edge disposed opposite the proximal edge, a front edge connecting between the front corner and the distal edge, and a rear edge connecting between the rear corner and the distal edge,
   the middle edge portion of the apron is stretched on the ground on the second row-side in pressed abutment against the trunk of the harvested tree, and
   on the first row-side:
   the front corner rests on the ground adjacent a tree-trunk following the tree to be harvested, and the rear corner rests on the ground adjacent a tree-trunk preceding the tree to be harvested,
   whereby at least one portion of the ground face rests on the ground on the first row-side, and at least another portion of the ground face rests on the second row-side.

3. The method according to claim 1, wherein:
   the apron is folded to confine the harvested fruit in the receiving face as a preliminary step before lifting the apron, and
   the apron is lifted from the ground with the fruit therein together in one bulk, as a following step.

4. The method according to claim 2, wherein:
   at least one portion of the ground face of the apron rests on the ground below the deflector, and
   the fruit harvested on the first row-side and on the second row-side is received on the receiving face of the apron,
   whereby fruit is guided from the deflector on the first row-side onto the receiving face on the second row-side.

5. The method according to claim 1, wherein:
   on the second row-side:
      the collection system is coupled to and operated in association with the cart having an open top opening including a front wall, a proximal sidewall proximal the tree, a distal sidewall opposite the proximal sidewall, and a rear wall opposite the front wall, and
      the collection system is operated in a load stroke for collecting the fruit gathered on the receiving face of the apron when in receiving position, and for discharging the fruit by gravity into the open top opening of the cart when in a discharge position, and further operated in a return stroke for returning from the discharge position to the receiving position.

6. The method according to claim 5, wherein the collection system includes:
   two arms, namely a front arm and a rear arm provided for simultaneous operation in mutual mirroring symmetry, each one of the two arms having a free extremity and a retained end, the two arms being pivotally coupled in appropriate spaced apart distance opposite and mutually away from each other, with each retained end being coupled to, respectively, a front portion and a rear portion of the cart, at either one of both, the proximate sidewall and a structure adjacent thereto,
   the front edge and the rear edge of the apron being appropriately attached to, respectively, the front arm and the rear arm,
   the distal edge of the apron being fixedly attached over the proximal sidewall of the cart, and
   the two arms being operated to cover a trajectory in a load stroke and in a return stroke, the load stroke starting with a draw and including a swing, and the return stroke retracing the trajectory of the load stroke in reversed direction motion, whereby fruit is received and discharged in one load stroke for collection into the open top opening of the cart, in one bulk.

7. The method according to claim 6, wherein:
   each one of the two arms is formed by coupling a primary arm portion to a secondary arm portion, the secondary arm portion performing the draw, and the primary arm portion performing the swing,
the draw is performed relative to the primary arm portion in either one of both translation and pivoting, and
the swing is performed by pivoting the primary arm portion relative to the cart.

8. The method according to claim 7, wherein:
the load stroke starts from the receiving position and ends in the discharge position, and
the return stroke starts from the discharge position and ends in the receiving position, the return stroke operating in opposite displacement direction relative to the load stroke,
the load stroke of the two arms includes a load draw and a load swing, with the load draw starting from the receiving position and up to a load position, and the load swing starting from the load position and up to the discharge position, and
the return stroke has a return swing and a return draw, the return swing starting from the discharge position and up to the load position, and the return draw starting from the load position and up to the receiving position.

9. The method according to claim 8, wherein:
a spatial angle is selected for directionally positioning a pivot forming the pivotally coupled retained end of each arm, the pivot of each arm being oriented in mutual mirroring image symmetry, and
a preset angle is selected for coupling between each arm and its respective pivot,
whereby appropriate selection of the spatial angle and of the preset angle permits displacement of the two arms in predetermined trajectories selected from the group consisting of, alone and in combination, counter-rotation and equi-directional rotation.

10. The method according to claim 9, wherein:
the preset angle is selected from the group of angles consisting of a perpendicular angle and of obtuse angles.

11. The method according to claim 10, wherein:
the spatial angle and the preset angle are selected to accommodate slanting down of each one of the two arms, from the corresponding retained pivotal end mounted on the cart to the free extremity resting on the ground, when in the receiving position,
whereby at least one portion of the apron rests on the ground when in receiving position.

12. The method according to claim 10, wherein:
the load swing includes swinging the two arms through an arc of circle selected from the group of arcs consisting of half a circle, less then half a circle, and more then half a circle.

13. The method according to claim 10, wherein:
the receiving position opposite a tree is departed upon completion of harvesting, and
the collection system is moved to enter receiving position opposite a following tree to be harvested, as soon as the secondary arm portions are drawn to reside on the second row-side,
whereby dwell time of the collection system opposite a tree is minimal.

14. The method according to claim 8, wherein:
the fruit is received through the open top opening for forwarding to the rear of the cart, and for discharge from the rear of the cart into a fruit collector,
a fruit collector is configured as a trailer hauled on trailer wheels by the cart and in alignment therewith, the trailer supporting a cage for receiving the fruit therein,
where the cage is tiltable by pivoting to the rear about an upper rear extremity of the trailer, and the trailer comprises a lifting mechanism for lifting the trailer upward and above the wheels, and
the fruit is unloaded from the cage into an open top load box of a vehicle appropriately positioned to the rear of the trailer, by operating the lifting mechanism to lift the cage to an unloading height, and by tilting the cage to the rear above the load box,
whereby the fruit is unloaded by gravity into the load box.

15. A collection system for collecting fruit harvested from the foliage of a tree planted in a row of trees, having a front, a rear, a first row-side and a second row-side, by operating, on the first row-side, a harvesting unit with a tree-fruit harvester for harvesting fruit from the tree into a cart, and a deflector for guiding fruit harvested mainly on the first row-side to the second row-side, the system comprising:
on the second row-side:
at least one portion of a pliable apron being spread on the ground in a receiving position, and under at least one portion of the foliage of the tree, the apron having a ground face that faces the ground during harvesting, and a receiving face opposite the ground face, for receiving the harvested fruit thereon, and
the apron receiving the fruit on the receiving face which is then folded, and thereafter, unfolded to discharge the fruit together in one bulk into the cart.

16. The system according to claim 15, wherein:
the apron is configired as a single piece unit having a substantially quadrilateral shape, and includes a proximal edge closer to the tree, with a middle edge portion disposed between a front corner to the front, and a rear corner to the rear, a distal edge disposed opposite the proximal edge, a front edge connecting between the front corner and the distal edge, and a rear edge connecting between the rear corner and the distal edge,
the middle edge portion of the apron being stretched on the ground on the second row-side in pressed abutment against the trunk of the harvested tree, and
on the first row-side:
the front corner rests on the ground adjacent a tree-trunk following the tree to be harvested, and the rear corner rests on the ground adjacent a tree-trunk preceding the tree to be harvested,
whereby at least one portion of the ground face rests on the ground on the first row-side, and at least another portion of the ground face rests on the second row-side.

17. The system according to claim 16, wherein:
the harvested fruit is first confined in the receiving face before lifting the apron, and
the apron is lifted thereafter from the ground, with the fruit therein in one bulk.

18. The system according to claim 17, wherein:
at least one portion of the ground face of the apron rests on the ground below the deflector, and
the fruit harvested on the first row-side and on the second row-side is received on the receiving face of the apron,
whereby fruit is guided from the deflector on the first row-side onto the receiving face on the second row-side.

19. The system according to claim 15, wherein:
on the second row-side:
the collection system is coupled to and operated in association with the cart having an open top opening defined by a front wall, a proximal sidewall proximal the tree, a distal sidewall opposite the proximal sidewall, and a rear wall opposite the front wall, and the collection system is operated in a load stroke for collecting the fruit gathered on the receiving face of the apron when in receiving position, and for discharging the fruit by gravity into the open top opening of the cart when in a discharge position, and further operates in a return stroke for returning from the discharge position to the receiving position.

20. The system according to claim 19, wherein the collection system includes:

two arms, namely a front arm and a rear arm are provided for simultaneous operation in mutual mirroring symmetry, each one of the two arms having a free extremity and a retained end, the two arms being pivotally coupled in appropriate spaced apart distance opposite and mutually away from each other, with each retained end being coupled to, respectively, a front portion and a rear portion of the cart, at either one of both, the proximate sidewall and a structure adjacent thereto, the front edge and the rear edge of the apron being attached appropriately to, respectively, the front arm and the rear arm, the distal edge of the apron being fixedly attached over the proximal sidewall of the cart, and the two arms being operated in a load stroke and in a return stroke, the load stroke starting with a draw and including a swing, and the return stroke retracing the trajectory of the load stroke in reversed direction motion, whereby fruit is received and discharged in one load stroke for collection into the open top opening of the cart, in one bulk.

21. The system according to claim 20, wherein:

each one of the two arms is formed by coupling a primary arm portion to a secondary arm portion, the secondary arm portion performing the draw, and the primary arm portion performing the swing, the draw being performed relative to the primary arm portion in either one of both translation and pivoting, and the swing being performed by pivoting the primary arm portion relative to the cart.

22. The system according to claim 21, wherein:

the load stroke starts from the receiving position and ends in the discharge position, and the return stroke starts from the discharge position and ends in the receiving position, with the return stroke operating in opposite displacement direction relative to the load stroke, the load stroke includes a load draw and a load swing of the two arms, with the load draw starting from the receiving position and ending in a load position, and the load swing starting from the load position to end in the discharge position, and the return stroke includes a return swing and a return draw, the return swing starting from the discharge position and up to the load position, and the return draw starting from the load position and up to the receiving position.

23. The system according to claim 22, wherein:

a spatial angle is selected for directionally positioning a pivot forming the pivotally coupled retained end of each arm, the pivot of each arm being oriented in mutual mirroring symmetry, and a preset angle is selected for coupling between each arm and its respective pivot, whereby appropriate selection of the spatial angle and of the preset angle permits displacement of the two arms in predetermined trajectories selected alone and in combination, from the group consisting of counter-rotation and equidirectional rotation.

24. The system according to claim 23, wherein:

the preset angle is selected from the group of angles consisting of a perpendicular angle and of obtuse angles.

25. The system according to claim 24, wherein:

the spatial angle and the preset angle are selected to accommodate slanting down of each one of the two arms, from the corresponding retained pivotal end mounted on the cart to the free extremity resting on the ground, when in the receiving position, whereby at least one portion of the apron rests on the ground when in receiving position.

26. The system according to claim 24, wherein:

the two arms swing through an arc of circle selected from the group of arcs consisting of half a circle, less then half a circle, and more then half a circle.

27. The system according to claim 24, wherein:

the collection system leaves the receiving position opposite a tree upon completion of harvesting, and moves to enter receiving position opposite a following tree to be harvested, as soon as the secondary arm portions are drawn to reside on the second row-side, whereby dwell time of the collection system opposite a tree to be harvested is minimal.

28. The system according to claim 23, wherein:

the fruit is received through the open top opening for forwarding to the rear of the cart, and for discharge from the rear of the cart into a fruit collector, a fruit collector is configured as a trailer hauled on trailer wheels by the cart and in alignment therewith, the trailer supports a cage for receiving the fruit therein, which cage is tiltable by pivoting to the rear about an upper rear extremity of the trailer, and the trailer includes a lifting mechanism for lifting the trailer upward and above the wheels, and the fruit is unloaded from the cage into an open top load box of a vehicle appropriately positioned to the rear of the trailer, by operating the lifting mechanism to lift the cage to an unloading height, and by tilting the cage to the rear above at least a portion of the load box, whereby the fruit is unloaded by gravity into the load box.

* * * * *